(12) United States Patent
Fukuta

(10) Patent No.: US 8,368,786 B2
(45) Date of Patent: Feb. 5, 2013

(54) IMAGE PICKUP LENS INCLUDING AT LEAST ONE LENS BLOCK WHEREIN A LENS PORTION OR LENS PORTIONS ARE FORMED ON A LENS SUBSTRATE, IMAGE PICKUP DEVICE, DIGITAL APPARATUS AND MANUFACTURING METHOD OF IMAGE PICKUP LENS

(75) Inventor: Yasunari Fukuta, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 158 days.

(21) Appl. No.: 12/933,156

(22) PCT Filed: Mar. 16, 2009

(86) PCT No.: PCT/JP2009/055046
§ 371 (c)(1),
(2), (4) Date: Sep. 17, 2010

(87) PCT Pub. No.: WO2009/116492
PCT Pub. Date: Sep. 24, 2009

(65) Prior Publication Data
US 2011/0007195 A1 Jan. 13, 2011

(30) Foreign Application Priority Data
Mar. 21, 2008 (JP) .................................. 2008-073348

(51) Int. Cl.
*H04N 5/335* (2011.01)
(52) U.S. Cl. ....................................................... 348/294
(58) Field of Classification Search .................. None
See application file for complete search history.

(56) References Cited

U.S. PATENT DOCUMENTS

| 5,675,440 | A | * | 10/1997 | Kanamori | 359/686 |
|---|---|---|---|---|---|
| 2002/0027722 | A1 | * | 3/2002 | Hankawa et al. | 359/689 |
| 2003/0197953 | A1 | * | 10/2003 | Yamaguchi et al. | 359/717 |
| 2004/0179276 | A1 | * | 9/2004 | Yamakawa | 359/793 |
| 2006/0262416 | A1 | * | 11/2006 | Lee et al. | 359/645 |
| 2009/0290235 | A1 | * | 11/2009 | Do | 359/717 |
| 2010/0046096 | A1 | * | 2/2010 | Hirao et al. | 359/795 |
| 2011/0001865 | A1 | * | 1/2011 | Hirao et al. | 348/335 |

FOREIGN PATENT DOCUMENTS

| JP | 2-29408 | 1/1990 |
|---|---|---|
| JP | 7-281089 | 10/1995 |
| JP | 2000-281725 | 10/2000 |

(Continued)

*Primary Examiner* — Jason Chan
*Assistant Examiner* — Abdelaaziz Tissire
(74) *Attorney, Agent, or Firm* — Cozen O'Connor

(57) ABSTRACT

To provide an inexpensive image pickup lens ensuring mass productivity and preventing deterioration of images due to fluctuation of a paraxial image-point position caused by water absorption, image pickup device, digital apparatus, and a manufacturing method of the image pickup lens, the image pickup lens includes: at least one lens block including a lens substrate, and a lens portion or lens portions formed on at least one of an object-side surface or an image-side surface of the lens substrate. The lens portion is formed of an energy-curable resin material which is different from a material of the lens substrate. At least one lens portion has a dimension change rate caused by water absorption which is larger than a dimension change rate caused by water absorption of the lens substrate, and satisfies the predetermined expression about a change in refractive index the energy-curable resin material caused by water absorption.

16 Claims, 11 Drawing Sheets

FOREIGN PATENT DOCUMENTS

| | | |
|---|---|---|
| JP | 2005-338109 | 12/2005 |
| JP | 2005-539276 | 12/2005 |
| JP | 2006-323365 | 11/2006 |
| JP | 3926380 | 3/2007 |
| JP | 3926479 | 3/2007 |
| JP | 3946245 | 4/2007 |
| JP | 2007-126636 | 5/2007 |
| JP | 2007-127953 | 5/2007 |
| JP | 2007-137984 | 6/2007 |
| JP | 2007-231237 | 9/2007 |
| JP | 4022246 | 10/2007 |
| JP | 2007-284650 | 11/2007 |
| JP | 2008036950 | * 2/2008 |
| JP | 2008036950 | * 10/2008 |
| JP | 2009198872 | * 3/2009 |
| JP | 2009198872 | * 9/2009 |
| WO | WO 2007/116721 | 10/2007 |
| WO | WO 2007/119512 | 10/2007 |
| WO | WO02008102648 | * 8/2008 |

* cited by examiner

FIG. 3a
FIG. 3b
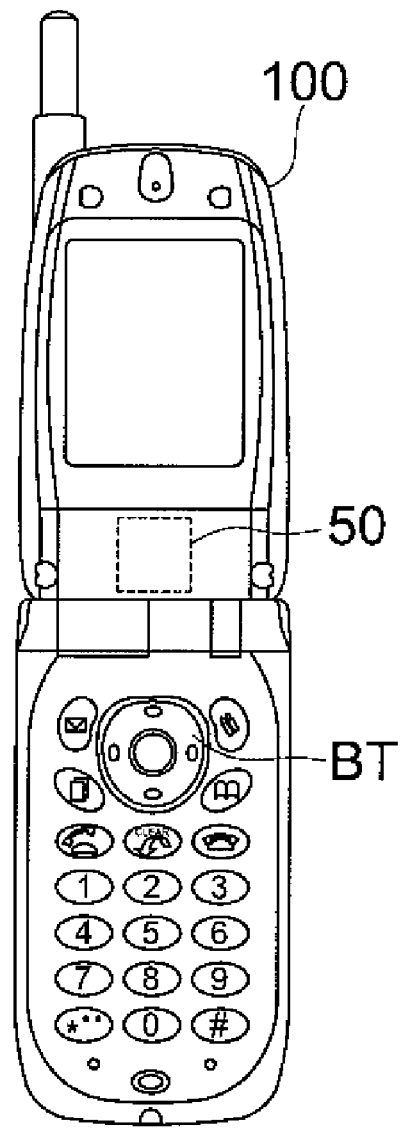
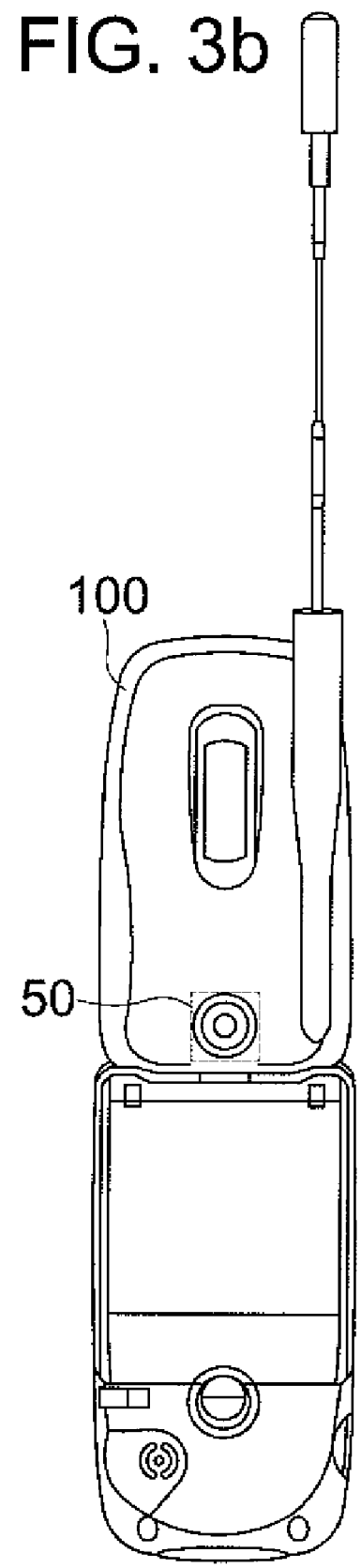

US 8,368,786 B2

IMAGE PICKUP LENS INCLUDING AT LEAST ONE LENS BLOCK WHEREIN A LENS PORTION OR LENS PORTIONS ARE FORMED ON A LENS SUBSTRATE, IMAGE PICKUP DEVICE, DIGITAL APPARATUS AND MANUFACTURING METHOD OF IMAGE PICKUP LENS

RELATED APPLICATIONS

This application is a U.S. National Phase Application under 35 USC 371 of International Application PCT/JP2009/055046 filed Mar. 16, 2009.

This application claims the priority of Japanese application 2008-073348 filed Mar. 21, 2008, the entire content of which is hereby incorporated by reference.

TECHNICAL FIELD

The present invention relates to an image pickup lens of an image pickup device employing a solid-state image pickup element such as an image sensor of a CCD (Charge Coupled Devices) type and an image sensor of a CMOS (Complementary Metal-Oxide Semiconductor) type. In particular, the present invention relates to an image pickup lens in an optical system employing a wafer-scale lens which is suitable for mass production, an image pickup device employing the image pickup lens, digital apparatus, and a manufacturing method of the image pickup lens.

BACKGROUND ART

A compact and thin-type image pickup device (which is also called a camera module, hereinafter) has come to be mounted on a mobile terminal representing a compact and thin-type electronic device such as a cell phone and PDA (Personal Digital Assistant), whereby, it has become possible to transmit mutually not only voice information but also image information to a remote location.

As image pickup elements used for these image pickup devices, a solid-state image pickup element such as an image sensor of a CCD type and an image sensor of a CMOS type are used. In recent years, increase of pixel numbers of the image pickup element have been advanced, and enhancement of its resolution and performance have been attained. As a lens for forming an image of a subject on the image pickup element, a lens made by resin that is suitable for mass production has come to be used for further cost reduction. A lens made of resin material has excellent workability and also has accurate transferability of a complicated shape of an aspheric surface, thus, it can cope also with an image pickup element with high resolution and high performance.

As an image pickup lens used in an image pickup device, there have been popularly known an optical system that is composed of lenses made of glass and an optical system that is composed of glass lenses and lenses made of resin material. Conventional optical systems are not enough to be used particularly for an image pickup device of a mobile terminal, and achieving both of much more compactness of the optical system and mass productivity required for the mobile terminal has been strongly demanded. However, it has been difficult to realize this requirement at low cost.

For overcoming the problem, there has been suggested the following method of manufacturing a large amount of camera modules. In the method, a large amount of arrayed lens elements are simultaneously formed through a replica method on a wafer in a size of several inches. After the wafer is joined with a sensor wafer, the joined body is cut to form a large amount of camera modules. Lenses manufactured by this method are sometimes called wafer-scale lenses, and camera modules manufactured by this method are sometimes called wafer-scale camera modules. Concerning such a technology, an image pickup lens in which a lens portion or lens portions are formed on a lens substrate is disclosed in each of Patent Literature 1 and Patent Literature 2.

Patent Literature 1: JP-A No. 2006-323365
Patent Literature 2: JP-B No. 3929479

DISCLOSURE OF THE INVENTION

Problems to be Solved by the Invention

Resin materials used for general optical elements have characteristic features that when the resin material is kept in a humid environment, it easily absorbs water more than glass materials, resulting in occurrence of change in refractive index. On the other hand, wafer-scale lenses are generally made of energy-curable resin material such as thermosetting resin material and UV-curable resin material. However, energy-curable resin materials also have characteristic features that the refractive index is changed by water absorption. When power of the total optical system is changed by the change in refractive index, a position of a paraxial image-point fluctuates (the focal point displaces). Therefore, there has been a problem that using such a wafer-scale lens as an image pickup lens results in deterioration of image quality. Further, when trying to form a wafer-scale lens by using a resin material which easily absorbs water, bubbles and silver streaks are generated in a molded body, which has brought cost increase and a decline of productivity caused by aggravation of the yield rate. Further, there has also been a problem that cloudiness is caused because of water absorption when a wafer-scale lens incorporated in a manufactured article is used.

The present invention has been achieved in view of the aforesaid circumstances, and is aimed to provide an inexpensive image pickup lens ensuring mass productivity and preventing deterioration of image quality due to fluctuation in position of a paraxial image-point caused by water absorption, an image pickup device, a digital apparatus, and a manufacturing method of the image pickup lens.

Solution to Problem

An image pickup lens described in Item 1 is an image pickup lens comprising: at least one lens block. The lens block comprises a lens substrate being a parallel flat plate, and a lens portion or lens portions with positive power formed on at least one of an object-side surface or an image-side surface of the lens substrate. The lens portion or lens portions comprise an energy-curable resin material which is different from a material of the lens substrate. At least one lens portion with positive power among the lens portion or lens portions has a dimension change rate caused by water absorption that is larger than a dimension change rate caused by water absorption of the lens substrate, and satisfies the following conditional expression (1).

$$0.0 \leq dn \leq 150 \times 10^{-5} \qquad (1)$$

In the conditional expression, dn is a difference (dn2−dn1) between a refractive index dn1 of the energy-curable resin material measured by keeping the energy-curable resin material in an absolute thy condition at 95° C. for three days and a refractive index dn2 of the energy-curable resin material measured by keeping the energy-curable resin material at 60° C. and 90% RH for six days. In the present specification, "absolute dry condition" means a condition wherein no moisture is contained in an atmosphere, and "RH" means a relative humidity (unit %) obtained by dividing an amount of moisture vapor (mass-basis absolute humidity) contained in an atmosphere at a certain temperature (60° C. in this case) by an amount of saturated water vapor (mass-basis absolute humidity) at the aforesaid temperature.

When a value of do exceeds the lower limit of the conditional expression (1), the change in refractive index caused by water absorption takes positive (increasing) direction. When the lens portion has positive power, a position of a paraxial image-point changes in the direction toward an object side even if the lens portion has a higher refractive index than a designed value because of water absorption at the point of use. Therefore, in the condition that there is provided a focusing function to move the whole image pickup lens in the optical axis direction, the image pickup lens moves to the image side when a focusing operation is carried out The movement does not exceed the total length in design, which avoids a malfunction that the focusing position is hardly adjusted. Further, in the condition that there is not provided a focusing function and the whole image pickup lens and a solid-state image pickup element are fixed (fixed focus lens), a focusing position is existent within a range from the infinity to close range in terms of an object distance, which avoids a malfunction that the focusing position cannot be adjusted because of water absorption.

In contrast to this, when the change in refractive index caused by water absorption takes negative (decreasing) direction (dn<0), a back focal length increases because of water absorption. Therefore, it is necessary to ensure an amount of margin for a lens movement for the focusing operation with considering an influence of water absorption in advance, which causes a problem that an image pickup device grows greater in size. Further, in the condition that there is not provided a focusing function and the whole image pickup lens and a solid-state image pickup element are fixed, an object distance at which the focusing position is adjusted is hardly ensured because of water absorption, and there is a fear that images are constantly blurred. These troubles can be solved by the present invention.

Incidentally, as for "energy-curable resin material", UV-curable resin material including epoxy resin is cited as an example of UV-curable resin that is hardened by addition of UV energy, and thermosetting resin including epoxy resin or thermosetting resin including acryl resin is cited as an example of thermosetting resin that is hardened by addition of heat energy.

It is desirable that the following conditional expression (1') is satisfied.

$$0.0 \leq dn \leq 100 \times 10^{-5} \quad (1')$$

When a value of dn becomes the upper limit of the conditional expression (1') or lower than that, the fluctuation in position of the paraxial image-point caused by the reflective index can be further reduced, by controlling the change in refractive index caused by water absorption.

It is further desirable that the following conditional expression (1") is satisfied.

$$0.0 \leq dn \leq 50 \times 10^{-5} \quad (1")$$

When a value of dn is made to be the upper limit of the conditional expression (1") or lower than that, the fluctuation in position of the paraxial image-point caused by the reflective index can be much more reduced, by controlling the change in refractive index caused by water absorption more effectively.

As for an image pickup lens described in Item 2, in the invention described in Item 1, at least one of the lens portion or lens portions satisfies the following conditional expression (2).

$$0.5 \leq |fl/f| \leq 1.1 \quad (2)$$

In the conditional expression, fl is a focal length of the lens portion obtained on an assumption that an object-side surface and an image-side surface of the lens portion are in contact with an air, and f is a composite focal length of a total system of the image pickup lens.

When a value of |fl/f| becomes the lower limit of the conditional expression (2) or more, power of the lens portion does not become excessively strong, which prevents excessively great change in position of the paraxial-image point caused by change in refractive index due to water absorption. On the other hand, when power of the lens portion is small, the change in position of the paraxial-image point caused by the change in refractive index due to water absorption can be reduced. Therefore, when a value of |fl/f| becomes the upper limit of the conditional expression or less, the power of the lens portion does not become excessively weak, which prevent a trouble that the total length becomes large.

It is desirable that the following conditional expression (2') is satisfied.

$$0.5 \leq |fl/f| \leq 0.7 \quad (2')$$

When the conditional expression (2') is satisfied, the fluctuation in position of the paraxial image-point caused by change in refractive index due to water absorption can be reduced more effectively.

As for the image pickup lens described in Item 3, in the invention described in Item 1, the lens portion satisfying the conditional expression (1) is placed at a position closest to an object in the image pickup lens.

As for the image pickup lens described in Item 4, in the invention described in Item 2, wherein the lens portion satisfying the conditional expression (2) is placed at a position closest to an object in the image pickup lens.

The lens portion arranged at the position closest to the object mainly bears the power of the image pickup lens for reducing the total length. By reducing the fluctuation in position of the paraxial image-point caused by the change in refractive index due to water absorption in the lens portion, fluctuation in position of the paraxial image-point due to water absorption of the whole image pickup lens system can be controlled effectively.

As for the image pickup lens described in Item 5, in the invention described in any one of Items 1 to 4, at least one of the lens portion or lens portions satisfies the conditional expression (3), and has a concave shape.

$$l/h \leq 3.5 \quad (3)$$

In the conditional expression, l is a length in a radius direction from the most-outer periphery of an optical surface of the lens portion to an outer diameter of the lens portion, and h is an effective radius of the lens portion.

When a value of l/h becomes the upper limit of the conditional expression (3) or lower, the volume of resin material of the lens portion in a range from effective diameter of the lens portion to the outer diameter of the lens portion does not become excessively great compared with the volume of the resin material within the effective radius of the lens portion, which prevents the problem that the resin material within the effective radius of the lens portion is pushed by the resin material outside the effective radius because of the dimension change accompanying the water absorption and that the fluctuation in position of the paraxial image-point caused by the dimension change accompanying water assumption becomes excessively large.

It is desirable that the following conditional expression (3') is satisfied.

$$l/h < 1.5 \qquad (3')$$

When the conditional expression (3') is satisfied, the change in position of the paraxial image-point caused by the dimension change due to water absorption can be reduced more effectively.

As for the image pickup lens described in Item 6, in the invention described in any one of Items 1 to 5, a dimension change rate α caused by water absorption of the energy-curable resin material used in the at least one of the lens portion or lens portions, satisfies the following conditional expression (4).

$$|\alpha| < 3.0\% \qquad (4)$$

In the conditional expression, the dimension change rate α is a change ratio (w1−w2)/w1×100[%] which is a ratio of a difference (w2−w1) between a dimension w1 of the energy-curable resin material measured by keeping the energy-curable resin material in an absolute dry condition at 95° C. for three days and a dimension w2 of the energy-curable resin material measured by keeping the energy-curable resin material at 60° C. and 90% RH for six days, to the dimension w1 at the absolute dry condition.

When the absolute value of the dimension change rate |α| becomes the upper limit of the conditional expression (4) or less, it prevents a problem that repeated changes in dimension of the lens portion because of water absorption result in detachment of the lens portion from the lens substrate portion.

It is desirable that the following conditional expression (4') is satisfied.

$$|\alpha| \leq 1.5\% \qquad (4')$$

When the absolute value of the dimension change rate 51 α| becomes the upper limit of the conditional expression (4') or less, the change in dimension of the lens portion caused by water absorption becomes more smaller, which reduces the change in position of the paraxial image-point caused by change in curvature radius of the lens portion due to water absorption.

It is further desirable that the following conditional expression (4") is satisfied.

$$|\alpha| \leq 1.0\% \qquad (4'')$$

When the absolute value of the dimension change rate |α| becomes the upper limit of the conditional expression (4") or less, the change in dimension of the lens portion caused by water absorption becomes further more smaller, which reduces the change in position of the paraxial image-point caused by change in curvature radius of the lens portion due to water absorption more effectively.

As for the image pickup lens described in Item 7, in the invention described in any one of Items 1 to 6, the energy-curable resin material used in the at least one of the lens portion or lens portions, satisfies the following conditional expression (5).

$$\rho \leq 4.5\% \qquad (5)$$

In the conditional expression, ρ is a water absorption rate and is defined as a change ratio (m1−m2)/m1×100[%] which is a ratio of a difference (m2−m1) between a weight m1 of the energy-curable resin material measured by keeping the energy-curable resin material in an absolute dry condition at 95° C. for three days and a weight m2 of the energy-curable resin material measured by keeping the energy-curable resin material at 60° C. and 90% RH for six days, to the weight m1 at the absolute dry condition.

The water absorption rate ρ becomes the upper limit of the conditional expression (5) or less, matters that bubbles and silver streaks are generated when the lens portion is molded can be prevented. When there defects are generated in the lens portion, they reduces the yield of products, which is great disadvantageous for wafer-scale lenses aiming mass production.

It is desirable that the following conditional expression (5') is satisfied.

$$\rho \leq 3.5\% \qquad (5')$$

The water absorption rate ρ becomes the upper limit of the conditional expression (5') or less, matters that bubbles and silver streaks are generated when the lens portion is molded can be prevented more effectively.

It is further desirable that the following conditional expression (5") is satisfied.

$$\rho \leq 2.0\% \qquad (5'')$$

The water absorption ρ becomes the upper limit of the conditional expression (5") or less, matters that bubbles and silver streaks are generated when the lens portion is molded can be prevented further more effectively.

As for the image pickup lens described in Item 8, in the invention described in any one of Items 1 to 7, the energy-curable resin material is a UV-curable resin material.

When the lens portion is made of UV-curable resin material, hardening time can be reduced and productivity can be enhanced. In recent years, resin with excellent heat resistance and curable resin material have been developed, and those materials can withstand a processing in which they are exposed under high temperature, that is a reflow processing.

As for the image pickup lens described in Item 9, in the invention described in any one of Items 1 to 8, inorganic microparticles with a maximum size being 30 nanometers or less are dispersed in the energy-curable resin material used in the at least one of the lens portion or lens portions.

When inorganic microparticles which is 30 nanometers or less in size are dispersed in at least one of the lens portion or lens portions, deterioration of its performance and fluctuation of image point position can be reduced without lowering light transmittance even if temperature changes, and an image pickup lens with excellent optical characteristics regardless of environmental change can be provided.

In general, if microparticles are mixed in a transparent resin material, light scatters therein and it causes lowered transmittance. Therefore, it has been difficult to use such a material as an optical material. However, by making a size of microparticles to be smaller than a wavelength of a transmitting light flux, occurrence of light scattering can be prevented substantially. Further, though it has been a drawback of resin material that its refractive index is lower than that of glass material, it has found that the refractive index can be made to be high, by dispersing inorganic particles having high refractive index in a resin material representing base material.

Specifically, it is possible to offer the material having an arbitral refractive index, by dispersing inorganic particles of a size of 30 nanometer or less, preferably of 20 nanometer or less, more preferably 15 nanometer or less, into a plastic material serving as a base material. The refractive index of a resin material is lowered if a temperature rises. However, when there are prepared inorganic particles whose refractive index rises if a temperature rises, and when the inorganic particles are dispersed in the resin material serving as a base material, properties of both parties act on each other to cancel, thus, fluctuations of refractive index for temperature changes can be made small. Further, on the contrary, when there are prepared inorganic particles whose refractive index declines if a temperature rises, and when the inorganic particles are dispersed in the resin material serving as a base material, fluctuations of refractive index for temperature changes can be made to be large. Specifically, it is possible to offer materials having arbitral temperature-dependency, by dispersing inorganic particles of a particle size of 30 nanometer or less, preferably 20 nanometer or less, more preferably 15 nanometer or less, into a plastic material serving as a base material.

For example, when inorganic particles such as aluminum oxide ($Al_2O_3$) or lithium niobate ($LiNbO_3$) are dispersed in resin, it is possible to obtain a plastic material having high refractive index and to make fluctuations in refractive index for temperature changes to be small.

As for the image pickup lens described in Item 10, in the invention described in any one of Items 1 to 9, at least one of the lens portion or lens portions has a lens surface shape whose inclination has a same sign within an area which is inside an effective radius and excludes a lens center.

When dimension change caused by water absorption is caused, internal stress is easily generated in surface shape which is within the effective radius and excludes the lens center, especially, in an areas in convex shape or concave shape. However, once internal stress has been generated, it causes birefringence and distribution of refractive index and optical performance can be deteriorated. By making the sign of inclination of the lens surface shape to be the same, an optical system with less internal stress and reduced deterioration of performance can be realized even when the dimension change caused by water absorption is caused. The expression "a lens surface shape whose inclination has a same sign" means that, when considering a cross section including the optical axis in an image pickup lens and defining a perpendicular direction to the optical axis as a basis direction, the directions of tangential lines at respective points on the lens surface shape usually face the same side compared with the basis direction (left side or right side facing the basis direction) as the points ranging from the optical axis toward the effective radius side along the lens surface shape are observed. For example, the shapes of lens portions L1a through L2b in FIG. 6 as Example 1 which will be described later, meet the above expression, but the shapes of lens portions L3a and L3b do not meet the expression.

As for the image pickup lens described in Item 11, in the invention described in any one of Items 1 to 10, all surfaces in contact with an air in the lens portion or lens portions have aspheric shapes. This structure allows the best use of effect of aspheric surfaces each of which have the maximum difference in refractive index among the surfaces in contact with the air and boundaries of the lens portion. Further, by forming the all lens surfaces in to aspheric shapes, occurrence of various aberrations can be minimized and the performance can be enhanced easily.

As for the image pickup lens described in Item 12, in the invention described in any one of Items 1 to 11, the lens substrate and at least one of the lens potion or lens portions are formed with at least one of an optical thin film or adhesive interposed their between.

By forming an optical thin film having a function such as an aperture stop and infrared blocking filter to be arranged between the lens portion and the lens substrate, optical members can be simplified, which realizes a cost reduction. By fixing the lens substrate and the lens portion together with adhesive, the resin material of the lens portion can be selected with giving priority to optical characteristics, even when the resin material of the lens portion as itself is a material with bad adherence, which realizes high performance and high function. Further, either of an optical thin film and adhesive can be extremely thin, and dimension change rate caused by water absorption of the optical thin film and adhesive can be sufficiently neglected. Therefore, the difference in dimension change rate caused by water absorption between the lens portion and the lens substrate becomes an important factor also in a lens block in which the lens portion and the lens substrate are fixed together through an optical thin film or adhesive.

An image pickup device described in Item 13 comprises: the image pickup lens described in any one of Items 1 to 12; and an image pickup element for converting an optical image into electric signal, wherein the image pickup lens forms an optical image of a subject on a light-receiving surface of the image pickup element. Thereby, an inexpensive image pickup device which withstands a use under high humidity can be provided.

A digital apparatus described in claim 14 comprises the image pickup device of Item 13, and at least one of a function of shooting a still image of the subject and a function of shooting a moving image of the subject. Thereby, an inexpensive digital apparatus which withstands a use under high humidity and has an image pickup function can be provided.

As for the digital apparatus described in Item 15, in the invention described in Item 14, the digital apparatus is a mobile terminal. Thereby, an inexpensive mobile terminal which withstands a use under high humidity and has an image pickup function can be provided.

A manufacturing method of the image pickup lens described in Item 16 is a manufacturing method of the image pickup lens of any one of Items 1 to 12. The method comprises: a step of forming lens block units, wherein a plurality of the lens blocks are arrayed in each of the lens block units; a joining step of joining a plurality of the lens block units through an interval-regulating section together; and a cutting step of cutting the joined lens block units along the interval-regulating section to separate the lens block units. Thereby, image pickup lenses can be mass-produced at low cost.

Effects of the Invention

According to the present invention, an inexpensive image pickup lens ensuring mass-productivity and preventing deterioration of an image quality; an image pickup device, a digital apparatus, and a manufacturing method of the image pickup lens can be provided.

BRIEF DESCRIPTION OF DRAWINGS

FIGS. 3a and 3b show diagrams illustrating a state that image pickup device 50 is mounted on cell phone 100 as a mobile terminal.

REFERENCE SIGNS LIST

| | |
|---|---|
| 10 | Image pickup lens |
| 50 | Image pickup device |
| 51 | Image sensor |
| 51a | Photoelectric converting section |
| 52 | Substrate |
| 60 | Input section |
| 70 | Display section |
| 80 | Radio communication section |
| 92 | Storage section |
| 100 | Cell phone |
| 101 | Control section |
| LS1, LS2, LS3 | Lens substrates |
| L1a, L1b, L2a, L2b, L3a, L3b | Lens portions |

BEST MODE FOR CARRYING OUT THE INVENTION

Figure 1:
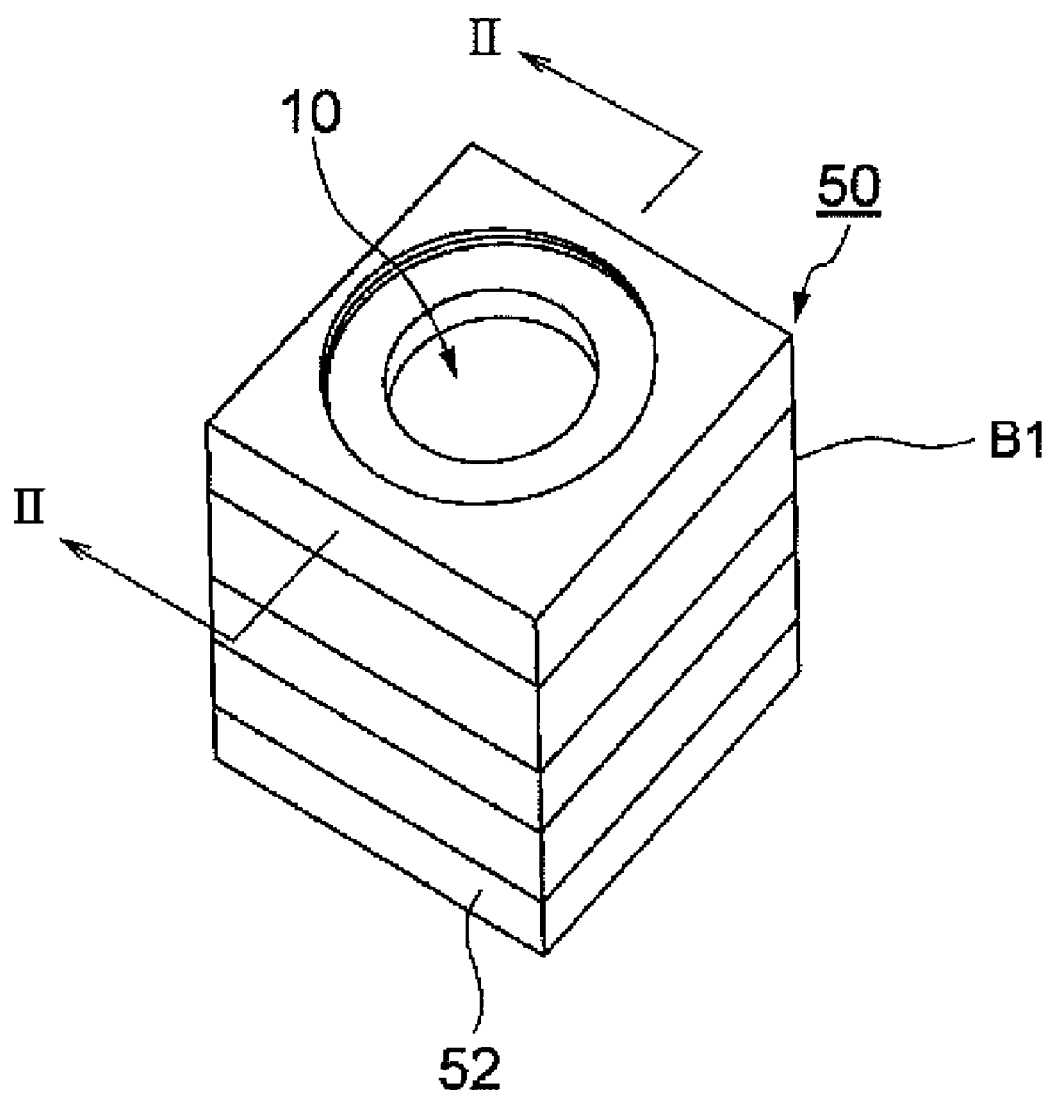
FIG. 1 shows a perspective view of image pickup device 50 relating to the present embodiment.
Figure 2:
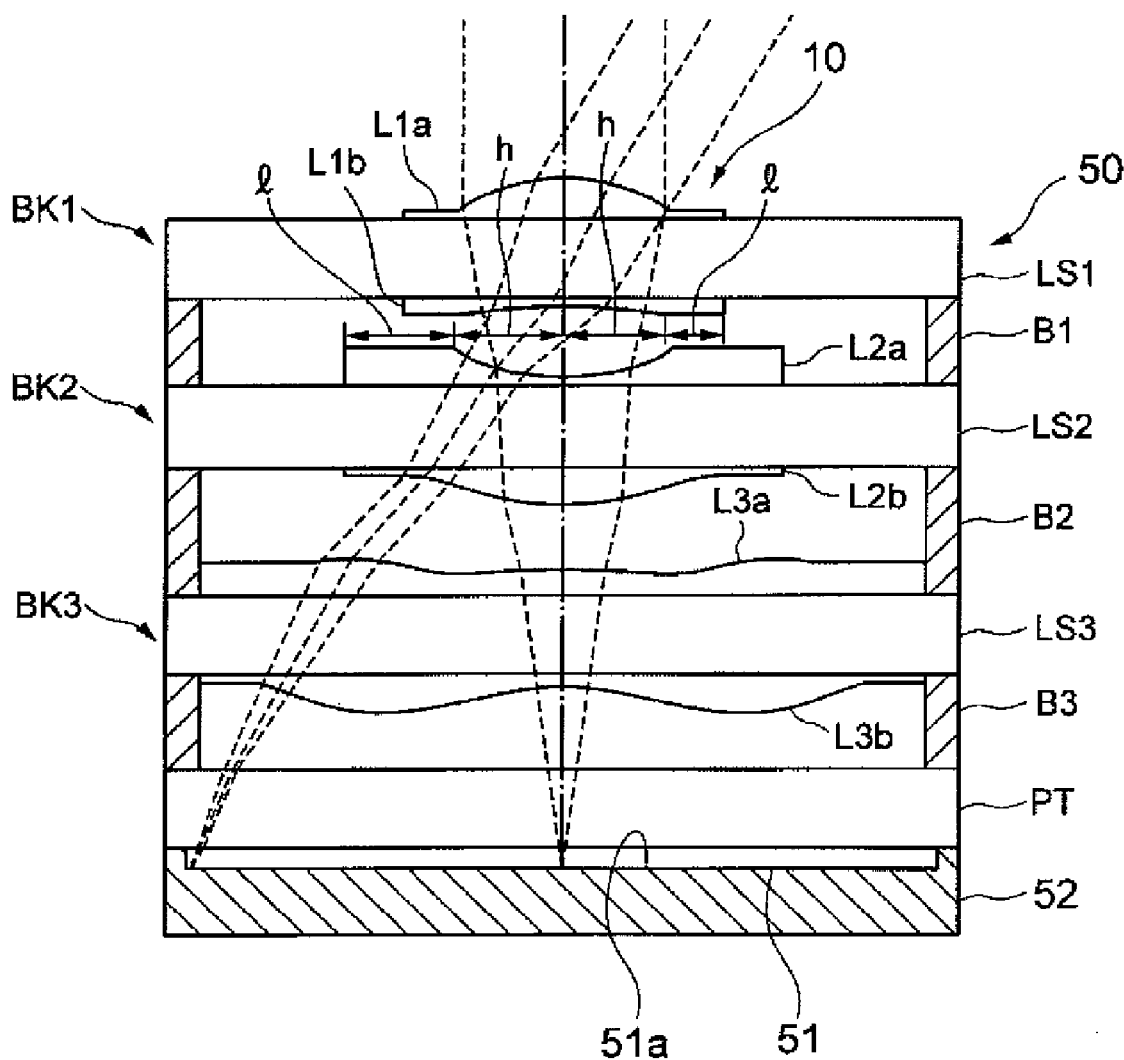
FIG. 2 shows a sectional view obtained by cutting the structure of FIG. 1 along arrowed lines II-II and by observing it in the direction of the arrows.

An embodiment of the invention will be explained as follows, based on drawings. FIG. 1 is a perspective view of image pickup device 50 relating to the present embodiment, and FIG. 2 is a sectional view obtained by cutting the structure of FIG. 1 along arrowed lines II-II and by observing it in the direction of the arrows. As shown in FIG. 2, image pickup device 50 is equipped with image sensor 51 of a CMOS type representing a solid-state image pickup element including photoelectric converting section 51a, image pickup lens 10 for making the photoelectric converting section 51a of the image sensor 51 pick up an image of a subject; and with substrate 52 holding image sensor 51 and including external connecting terminal (which is not shown) that conducts transmission and reception of electric signal, which are formed in one body. Image pickup lens 10 includes first lens block BK1, second lens block BK2, and third lens block BK3.

The image sensor 51 includes photoelectric converting section 51a representing a light-receiving section on the central portion of a plane surface on the light-receiving side of the image sensor 51. On the photoelectric converting section 51a, pixels (photoelectric converting elements) are arranged on a two-dimensional basis. The photoelectric converting section is connected to an unillustrated signal processing circuit. The signal processing circuit is composed of a drive circuit that obtains signal electric charges by driving respective pixels in succession, A/D converting section that converts each signal electric charge into digital signal and of a signal processing section that forms an output of image signal by using the digital signal. Further, many pads (which is not shown) are arranged in the vicinity of an outer edge of the plane surface on the light-receiving side of the image sensor 51, and they are connected to substrate 52 through an unillustrated wire. The image sensor 51 converts signal electric charges coming from photoelectric converting section 51a into image signal such as digital YUV signal, and outputs the signal to a prescribed circuit on the substrate 52 through a wire (which is not shown). In this case, Y represents a luminance signal, U (=R−Y) represents color difference signal between red signal and a luminance signal and V (=B−Y) represents color difference signal between blue signal and a luminance signal. Meanwhile, a solid-state image pickup element is not limited to the aforesaid image sensor of a CMOS type, and others such as CCD can be used.

Substrate 52 that supports the image sensor 51 is connected to be capable of communicating with the image sensor 51 through an unillustrated wire.

The substrate 52 is connected to an external circuit (for example, a control circuit provided on an upper device of a mobile terminal on which an image pickup apparatus is mounted) through an unillustrated external connecting terminal, to make it possible to receive the supply of voltage and clock signal for driving image sensor 51 from an external circuit and of clock signal, and to output digital YUV signal to external circuits.

An upper portion of the image sensor 51 is sealed by plate PT such as an infrared blocking filter fixed on the upper surface of the substrate 52. On the upper surface of the plate PT, there is fixed a bottom edge of spacer member B3 representing an interval-regulating member. Further, the third lens block BK3 is fixed on an upper edge of the spacer member B3. On the upper surface of the third lens block BK3, there is fixed a bottom edge of another spacer member B2 representing an interval-regulating member. The second lens block BK2 is fixed on an upper edge of the spacer member B2. On the upper surface of the second lens block BK2, there is fixed a bottom edge of another spacer member B1 representing an interval-regulating member. On the upper surface of the spaced member B1, there is fixed lens block BK1. The figures show an example which is structured with spacer member B1 through B3 as interval-regulating members which are separated bodies. However, the scope of the present invention is not limited to it. For example, a shape corresponding to the function of spacer member B1 as an interval-regulating member may be formed on at least one of lens sections L1b and L2a formed on lens substrates to be one body. Further, a shape corresponding to the function of spacer member B2 as an interval-regulating member may be formed on at least one of lens sections L2b and L3a formed on lens substrates to be one body. Alternatively, a shape corresponding to the function of spacer member B2 as an interval-regulating member may be formed on lens section L3a to be one body, and a shape corresponding to the function of spacer member B3 as an interval-regulating member may be formed on lens section L3b to be one body.

The first lens block BK1 is composed of first lens substrate LS1 that is a parallel flat plate, and of lens portions L1a and L1b formed respectively on the object side and on the image side of the first lens substrate. The second lens block BK2 is composed of the second lens substrate LS2 that is a parallel flat plate, and of lens portions L2a and L2b formed respectively on the object side and on the image side of the second lens substrate. The third lens block BK3 is composed of the third lens substrate LS3 that is a parallel flat plate, and of lens portions L3a and L3b formed respectively on the object side and on the image side of the third lens substrate. It is preferable that an optical thin film including an aperture forming a stop is formed at a position between the first lens portion L1a and the lens substrate LS1.

For example, in the case of Example 1 which will be described later, a dimension change rate caused by water absorption of each of lens portions L1a, L2b, and L3a is larger than a dimension change rate caused by water absorption of the lens substrate. Further, lens portions L1a, L2b, and L3a having positive power satisfy the following conditional expression (1).

$$0.0 \leq dn \leq 150 \times 10^{-5} \quad (1)$$

In the above conditional expression, dn is a difference (dn2−dn1) between a refractive index dn1 of the UV-curable resin material measured by keeping the UV-curable resin material as a material of lens portions L1a through L3a in an absolute dry condition at 95° C. for three days and a refractive index dn2 of the UV-curable resin material measured by keeping the energy-curable resin material at 60° C. and 90% RH for six days.

Further, in the case of Example 1 which will be described later, lens portions L1a, L2a and L3b satisfy the following conditional expressions (2).

$$0.5 \leq |fl/f| \leq 1.1 \quad (2)$$

In the conditional expression above, fl is a focal length of each of the lens portions L1a, L2a and L3b obtained on an assumption that an object-side surface and an image-side surface of each of the lens portions L1a, L2a and L3b are in contact with an air, and f is a composite focal length of a total system of the image pickup lens 10.

Further, in the case of Example 1 which will be described later, lens portions L1b, L2a and L3b satisfy the following conditional expression (3) and form concave shapes.

$$l/h \leq 3.5 \quad (3)$$

In the conditional expression, l is a length in a radius direction from the most-outer periphery of an effective diameter section of each of the lens portions L1b, L2a and L3b to an outer diameter of each of the lens portions L1b, L2a and L3b, respectively, and his an effective radius of each of the lens portions L1b, L2a and L3b.

Further, in the case of Example 1 which will be described later, a dimension change rate α caused by water absorption of the UV-curable resin material which is a material of in the lens portions L1a through L3a, satisfies the following conditional expression (4).

$$|\alpha| \leq 3.0\% \quad (4)$$

In the conditional expression, the dimension change rate α is a change ratio (w1−w2)/w1×100[%] which is a ratio of a difference (w2−w1) between a dimension w1 of the UV-curable resin material which is a material of the lens portions L1a through L3a measured by keeping the UV-curable resin material in an absolute dry condition at 95° C. for three days and a dimension w2 of the UV-curable resin material measured by keeping the UV-curable resin material at 60° C. and 90% RH for six days, to the dimension w1 at the absolute dry condition.

Further, in the case of Example 1 which will be described later, UV-curable resin material which is a material of the lens portions L1a through L3a satisfy the following conditional expression (5).

$$\rho \leq 4.5\% \quad (5)$$

In the conditional expression, ρ is a water absorption rate and is defined as a change ratio (m1−m2)/m1×100[%] which is a ratio of a difference (m2−m1) between a weight m1 of the UV-curable resin material which is a material of the lens portions L1a through L3a measured by keeping the UV-curable resin material in an absolute dry condition at 95° C. for three days and a weight m2 of the UV-curable resin material measured by keeping the UV-curable resin material at 60° C. and 90% RH for six days, to the weight m1 at the absolute dry condition.

Further, in the case of Example 1 which will be described later, each of lens portions L1a through L2b has a lens surface shape whose inclination has the same sign within an area which is inside its effective radius and excludes its lens center. In lens blocks BK1, BK2 and BK3, each of the lens substrates LS1, LS2 and LS3 is made of glass material, while, each of lens portions L1a through L3b in which all lens surfaces which are in contact with air are aspheric surfaces is made of resin material. Incidentally, it is preferable that each of the lens portions L1a through L3a is made of UV-curable resin material in which inorganic microparticles with a maximum size being 30 nanometers or less are dispersed.

An embodiment of the use of image pickup device 50 described above will be described.

Figure 4:
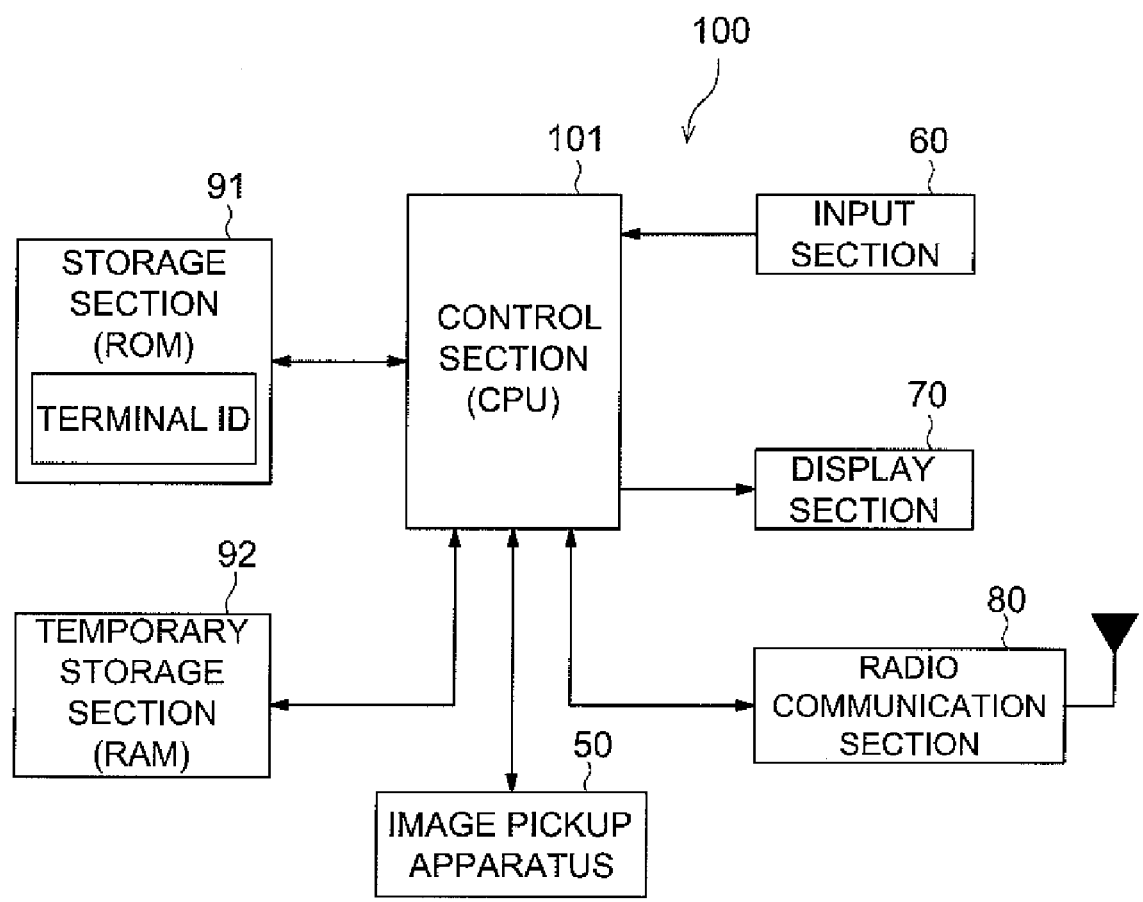
FIG. 4 shows a control block diagram of cell phone 100.

FIGS. 3a and 3b show a state that image pickup device 50 is mounted on cell phone 100 as a mobile terminal which is a digital apparatus. FIG. 4 shows a control block diagram of cell phone 100.

The image pickup device 50 is provided, for example, so that the object-side end of the image pickup lens is disposed on the back surface of cell phone 100 (where the side of the liquid crystal display is assumed to be a front surface), to be placed at a lower position of the liquid crystal display.

External connecting terminal (which is not shown) of the image pickup device 50 is connected to control section 101 of cell phone 100, and image signal such as luminance signal or color difference signal is outputted to the control section 101.

On the one hand, as shown in FIG. 4, cell phone 100 is provided with: control section (CPU) 101 which centrally controls each section and executes the program corresponding to each processing, input section 60 which is an input section for indicating and inputting the number, display section 70 that displays images and movies which are taken, radio communication section 80 for realizing an each kind of information communication to the external server, storage section (ROM) 91 which stores system programs of the cell phone 100, various processing programs, and necessary data such as terminal ID, and a temporary storage section (RAM) 92 which temporarily stores various processing programs and data to be processed by control section 101, processed data, image data from the image pickup device 50, as a working area.

When a photographer holding cell phone 100 aims image pickup lens 10 of the image pickup device 50 to a subject, image signal of a still image or a moving image is taken in image sensor 51. As the photographer presses button BT shown in FIG. 3, the shutter is released and image signal of a still image or moving image is taken in image pickup device 50. The image signal from inputted from the image pickup device 50 is sent to a control system of the cell phone 100, to be stored in storage section 92 or to be displayed on display section 70, or further to be transmitted to the outside as image information through radio communication section 80.

Figure 5A:
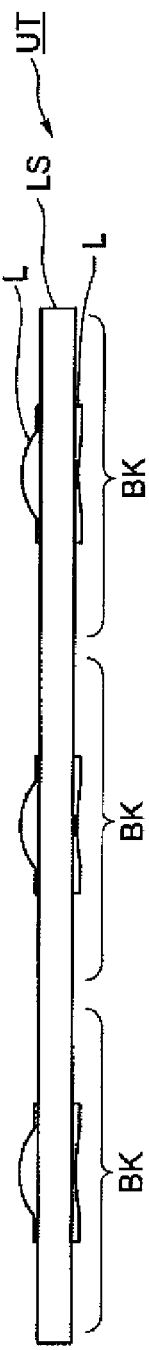
FIGS. 5a, 5h and 5c show diagrams illustrating steps of manufacturing an image pickup lens employed to the present embodiment.
Figure 5B:
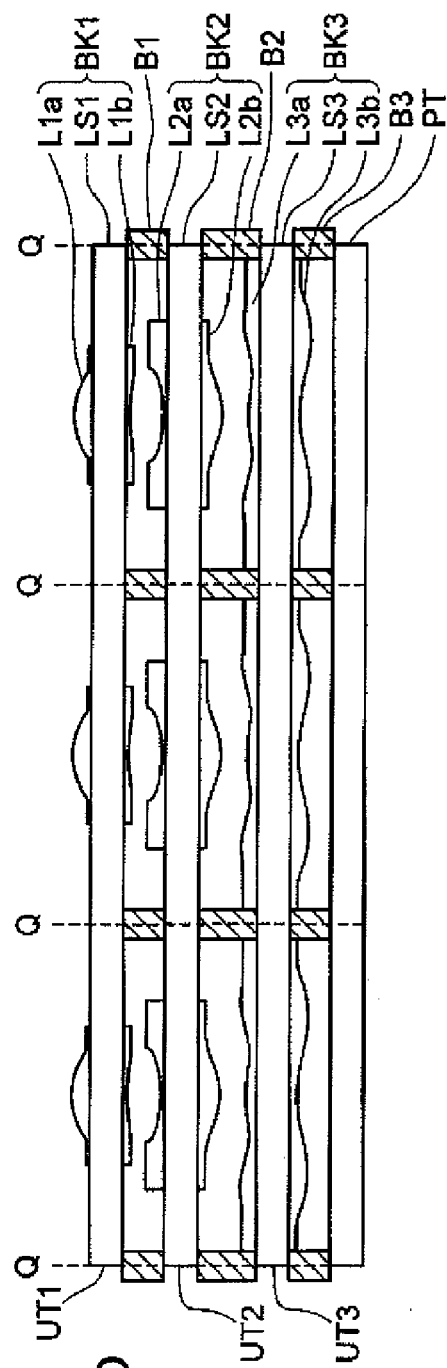
Figure 5C:
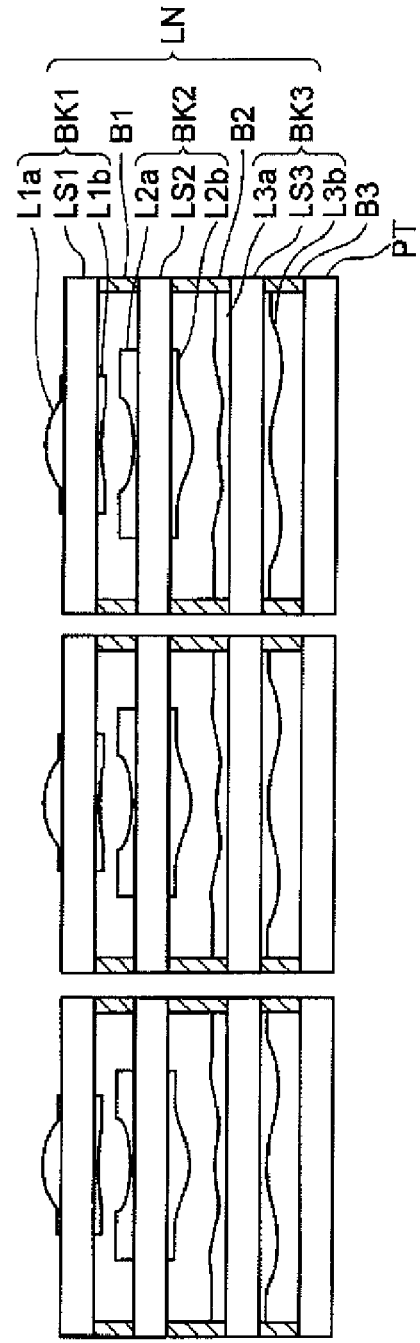

A manufacturing method of image pickup lens of the present embodiment will be explained as follows. FIGS. 5a, 5b and 5c show diagrams illustrating steps of manufacturing the image pickup lens relating to the present embodiment. First, lens block unit UT including plural lens blocks BK which are two-dimensionally arrayed as shown in a sectional view in FIG. 5a, is manufactured. The Lens block unit UT is manufactured, for example, by a replica method that can manufacture many lenses simultaneously at low cost. Incidentally, the number of lens block BK included in lens block unit UT may be a single or plural number.

The replica method is a method that curable resin is formed into lens shape with a mold and the lens shape is transferred to the resin. That is, a large numbers of lenses are formed on a lens wafer at the same time through the replica method.

Then, image pickup lens 10 is manufactured from the lens block units UT that are provided by the aforesaid methods. An example of the manufacturing process for the image pickup lens is shown on a schematic sectional diagram in FIG. 5b.

First lens block unit UT1 is composed of first lens substrate LS1 which is a parallel flat plate, plural first lens portions L1a, and plural second lens portions L1b. The plural first lens portions L1a are formed on one flat surface of the first lens substrate and the plural second lens portions L1b are formed on the other flat surface of the first lens substrate. The first lens substrate LS1 and lens portions L1a are formed together with a state that a stop formed by an optical thin film is interposed between them. When a stop or infrared broking filter is formed on a lens substrate, construction members can be reduced compared with the situation that they are separately prepared, which is preferable. Further, when a transparent thin film, for example, an antireflection coating is formed on a lens substrate, reflection caused between the lens portions and the lens substrate can be prevented, which reduces flare light and ghost. It is preferable that lens portions L1a and L1b are directly formed on the lens substrate LS1, but they may be formed with adhesive.

Second lens block unit UT2 is composed of second lens substrate LS2 which is a parallel flat plate, plural third lenses L2a, and plural fourth lenses L2b. The plural third lenses L2a are formed on one flat surface of the second lens substrate and the plural fourth lenses L2b are formed on the other flat surface of the second lens substrate. Similarly, when an antireflection coating is formed on the lens substrate, reflection caused between the lens portions and the lens substrate can be prevented, which reduces flare light and ghost. It is preferable that lens portions L2a and L2b are directly formed on the lens substrate LS2, but they may be formed with adhesive.

Third lens block unit UT3 is composed of third lens substrate LS3 which is a parallel flat plate, plural fifth lenses L3a, and plural sixth lenses L3b. The plural fifth lenses L3a are formed on one flat surface of the third lens substrate and the plural sixth lenses L3b are formed on the other flat surface of the third lens substrate. Similarly, when an antireflection coating is formed on the lens substrate, reflection caused between the lens portions and the lens substrate can be prevented, which reduces flare light and ghost. It is preferable that lens portions L3a and L3b are directly formed on the lens substrate LS3, but they may be formed with adhesive.

Spacer member (spacer) B1 that has an lattice shape and serves as an interval-regulating section is interposed between the first lens block unit UT1 and the second lens block unit UT2 (specifically, between the first lens substrate LS1 and the second lens substrate LS2) to keep the space between the lens block unit UT1 and the lens block unit UT2 to be constant. Further, another spacer member B2 that serves as an interval-regulating section is interposed between the second lens block unit UT2 and the third lens block unit UT3 to keep the space between the lens block unit UT2 and the lens block unit UT3 to be constant. Further, another spacer member B3 that serves as an interval-regulating section is interposed between plate PT and third lens block unit UT3 to keep the space between the plate PT and the lens block unit UT3 to be constant (In other words, spacer members B1, B2 and B3 can be said a three-step lattice). Under this situation, respective lens sections L1a through L3b are positioned at portions of holes of the lattice of the spacer members B1, B2 and B3.

Incidentally, plate PT is a sensor-chip-sized package on a wafer level including a micro-lens array, or a sensor cover glass or a parallel flat plate such as an infrared blocking filter.

In this case, when spacer member B1 is interposed between the first lens block unit UT1 and the second lens block UT2, then, spacer member B2 is interposed between the second lens block unit UT2 and the third lens block UT3, and spacer member B3 is interposed between the third lens block unit UT3 and the plate PT, lens substrates LS (the second lenses L1b through the sixth lenses L3b) are unified into one body to seal the spaces between the lens substrates.

Then, when the united first lens substrate LS1, second lens substrate LS2, third lens substrate LS3, spacer members B1, B2 and B3 and plate PT are cut along lattice frames of the spacer members B1, B2 and B3 (at a position of broken line Q), plural image pickup lenses 10 each being a three-element structure in which lens blocks are formed as a unified body, are obtained as shown in FIG. 5c. When the plate PT is a parallel flat plate like an infrared blocking filter, it is possible to obtain an image pickup device shown in FIG. 2 by fixing the image pickup lens on the substrate 52 in a way so that image sensor 51 may be interposed between the plate PT and the substrate 52, which is not illustrated thereafter.

When image pickup lenses 10 are manufactured by cutting off a member in which plural lens blocks BK (first lens block BK1, second lens block BK2 and third lens block BK3) are incorporated, as stated above, an adjustment of a lens distance and assembling for each image pickup lens 10 become needless. Therefore, mass production of image pickup devices each being expected for high image quality becomes possible.

In addition, since spacer members B1, B2 and B3 representing interval-regulating sections have shape of lattice, these spacer members B1, B2 and B3 also serve as guides in the case of cutting off image pickup lens 10 from the member in which plural lens blocks BK are incorporated. Therefore, it is possible to cut out image pickup lens 10 easily from the member housing therein plural lens blocks BK, which is not time-consuming. As a result, image pickup lenses 10 can be manufactured at low cost on a mass production basis.

Consideration of the foregoing makes it possible to say that the manufacturing method of image pickup lenses 10 includes a step of forming lens block units UT, wherein a plurality of the lens blocks BK are arrayed in each of the lens block units; a joining step of joining a plurality of the lens block units UT together through a spacer member in a shape of lattice as an interval-regulating section; a cutting step of cutting the joined lens block units UT along the lattice frame of the interval-regulating section to separate the lens block units. Such a manufacturing method is suitable for mass production for inexpensive lens systems. Incidentally, it is also enough that a single lens block unit is connected to a plate.

Though there has been given an explanation showing an example to adhere lens block units through spacer members representing an interval regulating section, the scope of the invention is not limited to this example. A functioning section corresponding to a spacer member may be formed as an interval regulating section on a region other than an optical effective surface on at least one side of the lens portion to be formed on a lens substrate.

EXAMPLES

Examples suitable to the above embodiment will be shown below. However, the scope of the invention is not limited to the following examples. Symbols used in each of Examples are as follows:

F1: Focal length of the total system of the image pickup lens
BF: Back focus
Fno: F number
Ymax: Diagonal length of an image plane r: Paraxial curvature radius of a lens surface d: Surface distance of lenses Nd: Refractive index of a lens at d-line vd: Abbe number of a lens at d-line w: half angle of view TL: Total lens length

*: Position of an aspheric surface stop: Position of a stop

The shape of the aspheric shape in the present invention is defined as follows. That is, X is represented by the following expression [Math. 1], where X is a distance (sag amount) from a tangential plane at the surface apex along the optical axis, h is a height from the optical axis, R is paraxial curvature radius, K is the conic constant, and $A_n$ (=4, 5, 8, ..., 14) is the n-th order aspheric surface coefficient $$X = \frac{h^2/R}{1 + \sqrt{1 - (1+K)h^2/R^2}} + \sum A_i h^i \qquad \text{[Math. 1]}$$

In the above expression, Ai represents $i^{th}$ order aspheric surface coefficient, R represents a curvature radius and K represents the conic constant.

Example 1

Lens data in Example 1 are shown in Table 1. Meanwhile, in the following tables, an exponent for 10 is assumed to be expressed by using e (for example, $2.5 \times 10^{-03}$ is expressed by 2.5×e−03). The F number, half angle of view, total length and back focus described in the following Construction Data Table 1 of Example 1 are effective values based on the total lens length and finite object distance, namely the object distance in the table. Further, the back focus is a distance from the rearmost lens surface to the paraxial image plane, expressed by the air-converted length. The total lens length is a value obtained by adding back focus to the distance from the forefront lens surface to the rearmost lens surface.

TABLE 1

Construction Data  unit: mm

| # | r | d | nd | vd |
|---|---|---|---|---|
| object | infinity | 1456.000 | | |
| 1* | 1.252 | 0.250 | 1.52000 | 57.00 |
| 2 (stop) | infinity | 0.500 | 1.47400 | 56.40 |
| 3 | infinity | 0.050 | 1.52000 | 57.00 |
| 4* | 4.909 | 0.442 | | |
| 5* | −1.885 | 0.050 | 1.52000 | 57.00 |
| 6 | infinity | 0.500 | 1.47400 | 56.40 |
| 7 | infinity | 0.250 | 1.52000 | 57.00 |
| 8* | −2.175 | 0.424 | | |
| 9* | 3.265 | 0.156 | 1.52000 | 57.00 |
| 10 | infinity | 0.500 | 1.47400 | 56.40 |
| 11 | infinity | 0.088 | 1.55000 | 32.00 |
| 12* | 1.551 | 0.531 | | |
| 13 | infinity | 0.500 | 1.51633 | 64.14 |
| 14 | infinity | 0.054 | | |
| image | infinity | | | |

TABLE 1-continued

Aspherical Coefficients

| # | K | A4 | A6 |
|---|---|---|---|
| 1 | 3.05958e−01 | −1.30816e−02 | −3.81369e−03 |
| 4 | 2.02241e+01 | 2.10611e−02 | −1.71489e−01 |
| 5 | 5.15349e+00 | −1.46432e−03 | 7.41202e−02 |
| 8 | 2.05378e+00 | −4.35175e−02 | 8.80698e−02 |
| 9 | 3.24213e−02 | −2.92113e−01 | 1.22510e−01 |
| 12 | −6.34748e+00 | −9.61452e−02 | 2.67900e−02 |

| # | A8 | A10 | A12 |
|---|---|---|---|
| 1 | −7.05497e−03 | −1.52999e−02 | 0.00000e+00 |
| 4 | 5.18291e−01 | −8.31280e−01 | 0.00000e+00 |
| 5 | 3.20063e−01 | −3.56834e−01 | 4.11694e−02 |
| 8 | 5.60302e−02 | 1.74354e−03 | −1.20205e−02 |
| 9 | −3.35706e−03 | −7.41606e−03 | 1.19605e−03 |
| 12 | −6.67033e−03 | 8.92508e−04 | −1.39287e−05 |

| | |
|---|---|
| Fl | 3.704 |
| Fno. | 2.880 |
| w | 31.350 |
| Ymax | 2.240 |
| TL | 4.124 |
| BF | 0.914 |

Lens group data

| Elem | Surfs | Focal Length |
|---|---|---|
| 1 | 1-4 | 3.00 |
| 2 | 5-8 | −690.94 |
| 3 | 9-12 | −5.98 |

Figure 6:
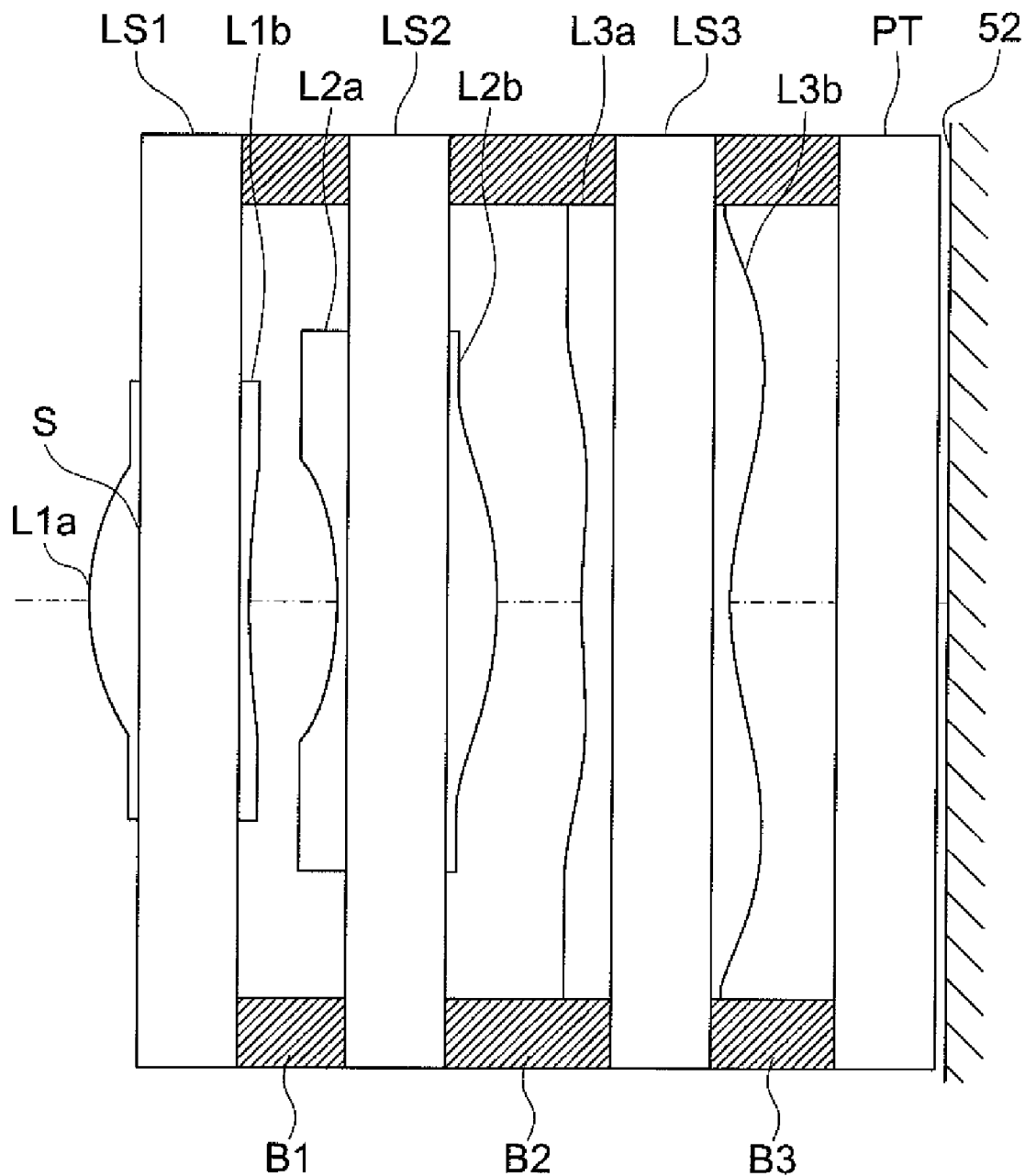
FIG. 6 shows a sectional view of Example 1.
Figure 7:
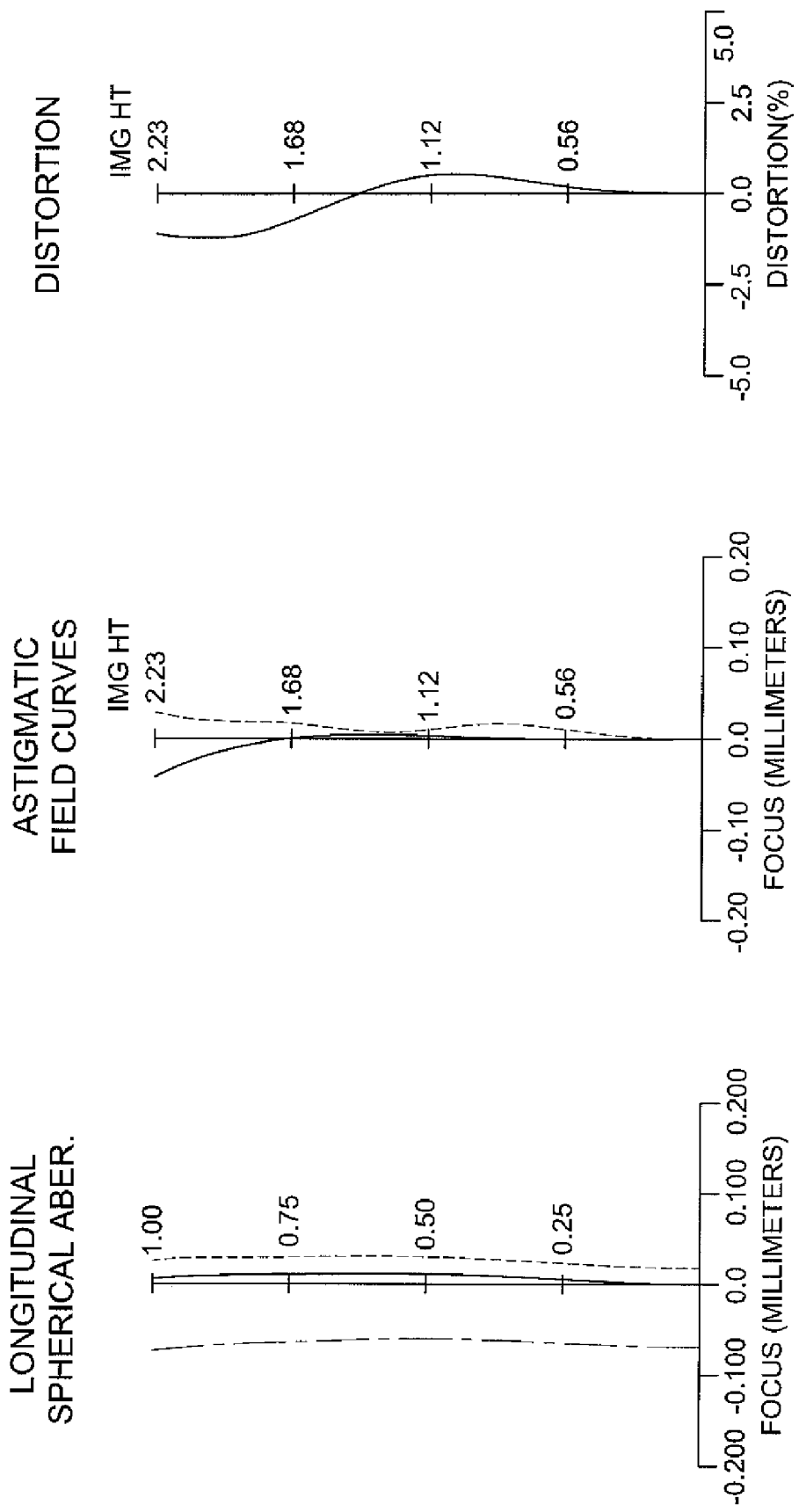
FIG. 7 shows aberration diagrams of the image pickup lens relating to Example 1, including spherical aberration, astigmatism, and distortion.

FIG. 6 is a sectional view of a lens in Example 1. FIG. 7 shows aberration diagrams of the image pickup lens relating to Example 1, including spherical aberration, astigmatism, and distortion. In the aberration diagrams, a one-dot chain line indicates an amount of spherical aberration for g line, a solid line indicates an amount of spherical aberration for d line, and a broken line indicates an amount of spherical aberration for C line, respectively. Further, in the diagram of astigmatism, a solid line indicates a sagittal surface and a broken line indicates a meridional surface, respectively.

The image pickup lens in Example 1 has three lens blocks. More specifically, first lens block BK1 is composed of first lens portion L1a, aperture stop S made of optical thin film, first lens substrate LS1 and of second lens portion L1b, next, second lens block BK2 is composed of third lens portion L2a, second lens substrate LS2 and of fourth lens portion L2b, and finally, third lens block BK3 is composed of fifth lens portion L3a, third lens substrate LS3 and of the sixth lens portion L3b, in the order from the object side. Further, each of all surfaces of lens portions which are in contact with the air has an aspheric shape.

Example 2

Lens data in Example 2 are shown in Table 2.

TABLE 2

Construction Data
unit: mm

| # | r | d | nd | νd |
|---|---|---|----|----|
| object | infinity | 1000.000 | | |
| 1* | 0.764 | 0.339 | 1.51000 | 57.00 |
| 2 (stop) | infinity | 0.300 | 1.52000 | 64.00 |
| 3 | infinity | 0.050 | 1.57000 | 34.00 |
| 4* | 2.066 | 0.354 | | |
| 5* | −2.349 | 0.063 | 1.51000 | 57.00 |
| 6 | infinity | 1.038 | 1.52000 | 64.00 |
| 7 | infinity | 0.419 | 1.57000 | 34.00 |
| 8* | 40.295 | 0.051 | | |
| 9 | infinity | 0.120 | | |
| 10 | infinity | 0.400 | 1.47140 | 65.20 |
| 11 | infinity | 0.046 | | |
| image | infinity | | | |

Aspherical Coefficients

| # | K | A4 | A6 | A8 | A10 |
|---|---|----|----|----|-----|
| 1 | −6.5717e−01 | 3.8280e−03 | 3.7836e+00 | −2.7872e+01 | 9.0731e+01 |
| 4 | 6.1930e+00 | 3.2777e−01 | −2.2506e+00 | 2.7026e+01 | −1.2223e+02 |
| 5 | −6.2923e+00 | −6.1202e−01 | −4.9616e−01 | −4.3802e+00 | 8.6579e+01 |
| 8 | 9.0315e+00 | −6.9099e−02 | 2.1782e−01 | −5.2328e−01 | 5.6027e−01 |

| # | A12 | A14 | A16 | A18 | A20 |
|---|-----|-----|-----|-----|-----|
| 1 | 5.7728e+00 | −4.4566e+02 | −8.5072e+02 | 6.4474e+03 | −8.0163e+03 |
| 4 | 3.6361e+02 | −3.4153e+02 | 3.6496e+01 | −1.5282e+02 | −2.1354e+02 |
| 5 | −6.0356e+02 | 1.5297e+03 | −1.3401e+03 | 8.1939e+01 | −1.7211e+02 |
| 8 | −3.3684e−01 | 1.1600e−01 | −2.1794e−02 | 1.9364e−03 | −5.5582e−05 |

| | | |
|---|---|---|
| Fl | | 2.795 |
| Fno. | | 2.880 |
| w | | 31.001 |
| Ymax | | 1.750 |
| TL | | 3.052 |
| BF | | 0.488 |

Lens group data

| Elem | Surfs | Focal Length |
|------|-------|--------------|
| 1 | 1-4 | 2.105 |
| 2 | 5-8 | −4.267 |

Figure 8:
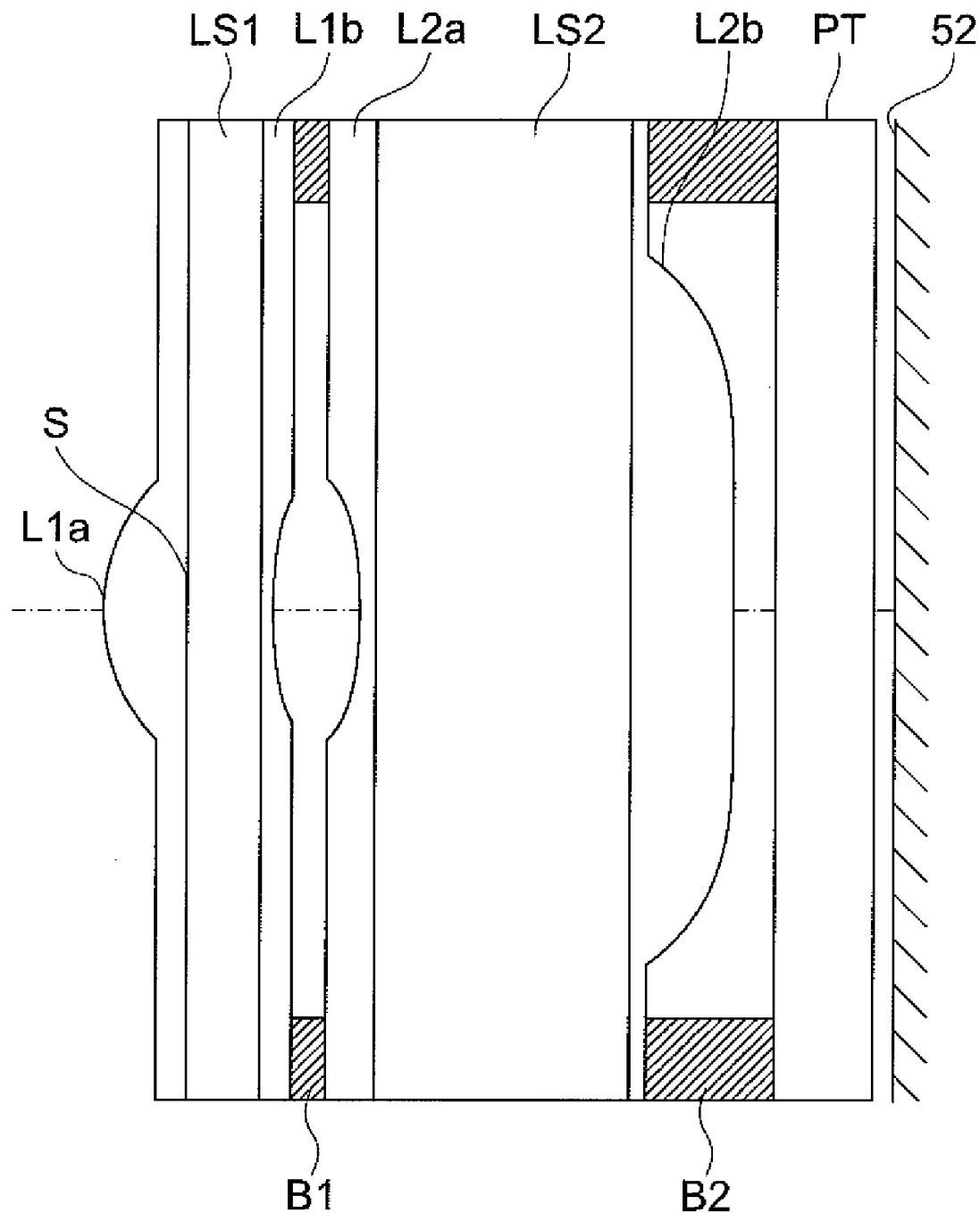
FIG. 8 shows a sectional view of Example 2.
Figure 9:
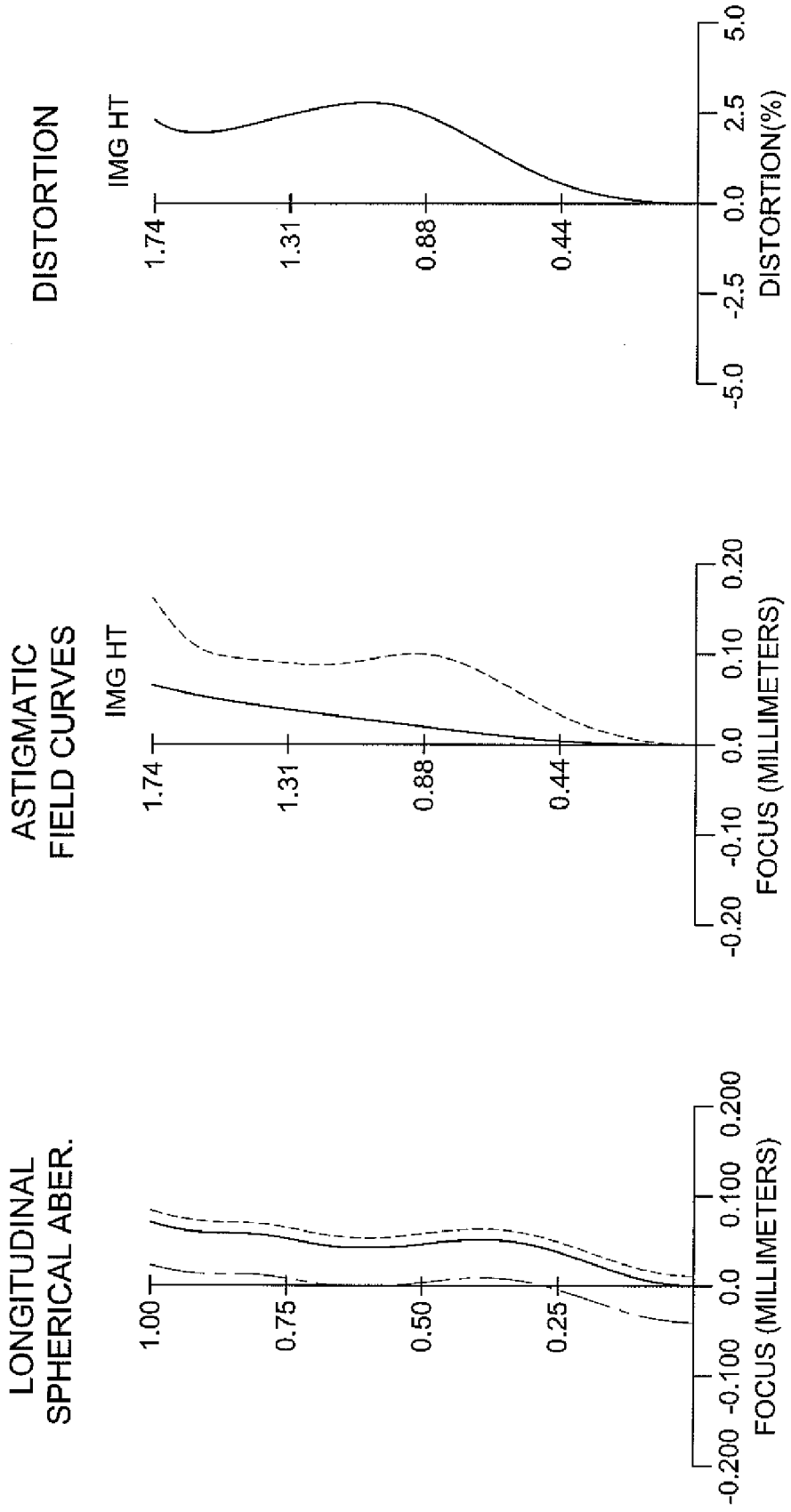
FIG. 9 shows aberration diagrams of the image pickup lens relating to Example 2, including spherical aberration, astigmatism, and distortion.

FIG. 8 is a sectional view of a lens in Example 2. FIG. 9 shows aberration diagrams of the image pickup lens relating to Example 2, including spherical aberration, astigmatism, and distortion. In the aberration diagram, a one-dot chain line indicates an amount of spherical aberration for g line, a solid line indicates an amount of spherical aberration for d line, and a broken line indicates an amount of spherical aberration for C line, respectively. Further, in the diagram of astigmatism, a solid line indicates a sagittal surface and a broken line indicates a meridional surface, respectively.

The image pickup lens in Example 2 has two lens blocks. More specifically, first lens block BK1 is composed of first lens portion L1a, aperture stop S made of optical thin film, first lens substrate LS1 and of second lens portion L1b, and then, second lens block BK2 is composed of third lens portion L2a, second lens substrate LS2 and of fourth lens portion L2b, in the order from the object side. Further, each of all surfaces of lens sections which are in contact with the air has an aspheric shape.

Example 3

Lens data in Example 3 are shown in Table 2.

TABLE 3

Construction Data  
unit: mm

| # | r | d | nd | νd |
|---|---|---|---|---|
| object | infinity | 850.000 | | |
| 1* | 0.881 | 0.280 | 1.52000 | 55.00 |
| 2 (stop) | infinity | 0.300 | 1.52000 | 64.00 |
| 3 | infinity | 0.080 | 1.57000 | 34.00 |
| 4* | 1.642 | 0.874 | | |
| 5* | 3.496 | 0.108 | 1.57000 | 34.00 |
| 6 | infinity | 0.500 | 1.52000 | 64.00 |
| 7 | infinity | 0.175 | 1.57000 | 34.00 |
| 8* | 2.298 | 0.401 | | |
| 9 | infinity | 0.500 | 1.51633 | 64.14 |
| 10 | infinity | 0.002 | | |
| image | infinity | | | |

Aspherical Coefficients

| # | K | A4 | A6 | A8 | A10 |
|---|---|---|---|---|---|
| 1 | −3.7084e−01 | 4.7596e−02 | 1.0306e+00 | −5.8738e+00 | 2.1133e+01 |
| 4 | 4.5387e+00 | 1.0291e−02 | 3.3694e+00 | −2.2397e+01 | 5.8509e+01 |
| 5 | −1.4755e+02 | 7.7521e−03 | −5.7401e−01 | 9.6302e−01 | −7.0437e−01 |
| 8 | −1.2524e+01 | −6.1843e−02 | −6.0965e−02 | 4.3801e−02 | −4.0477e−03 |

| # | A12 | A14 | A16 | A18 | A20 |
|---|---|---|---|---|---|
| 1 | −4.5409e+01 | 5.6652e+01 | | | |
| 4 | 6.5700e+01 | −3.2906e+02 | | | |
| 5 | 9.8465e−02 | −1.6020e−02 | 6.4661e−02 | 6.1750e−02 | −4.4763e−02 |
| 8 | −8.4558e−03 | 2.3313e−03 | | | |

| | |
|---|---|
| Fl | 2.954 |
| Fno. | 2.880 |
| w | 30.092 |
| Ymax | 1.750 |
| TL | 3.080 |
| BF | 0.763 |

Lens group data

| Elem | Surfs | Focal Length |
|---|---|---|
| 1 | 1-4 | 3.060 |
| 2 | 5-8 | −15.530 |

Figure 10:
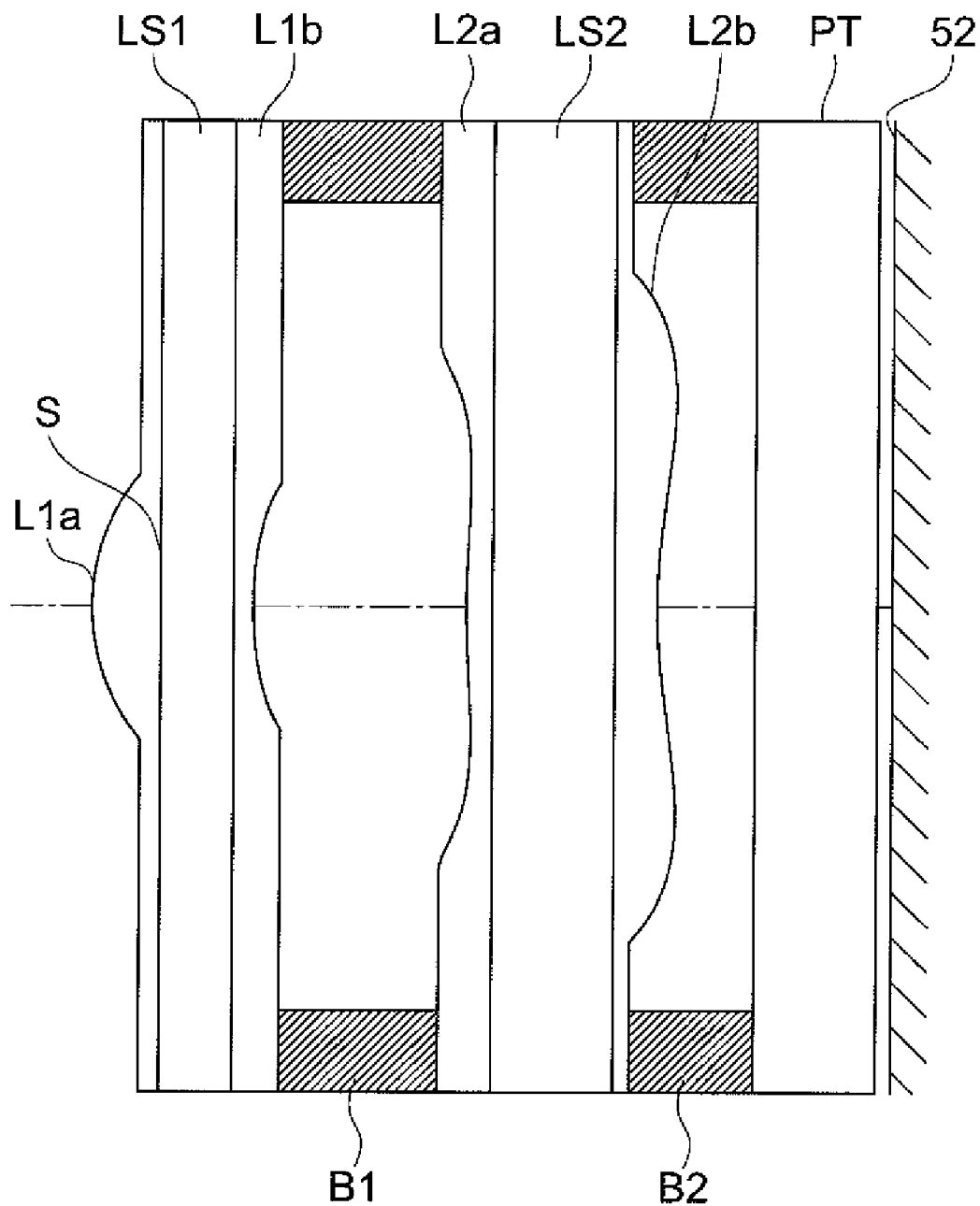
FIG. 10 shows a sectional view of Example 3.
Figure 11:
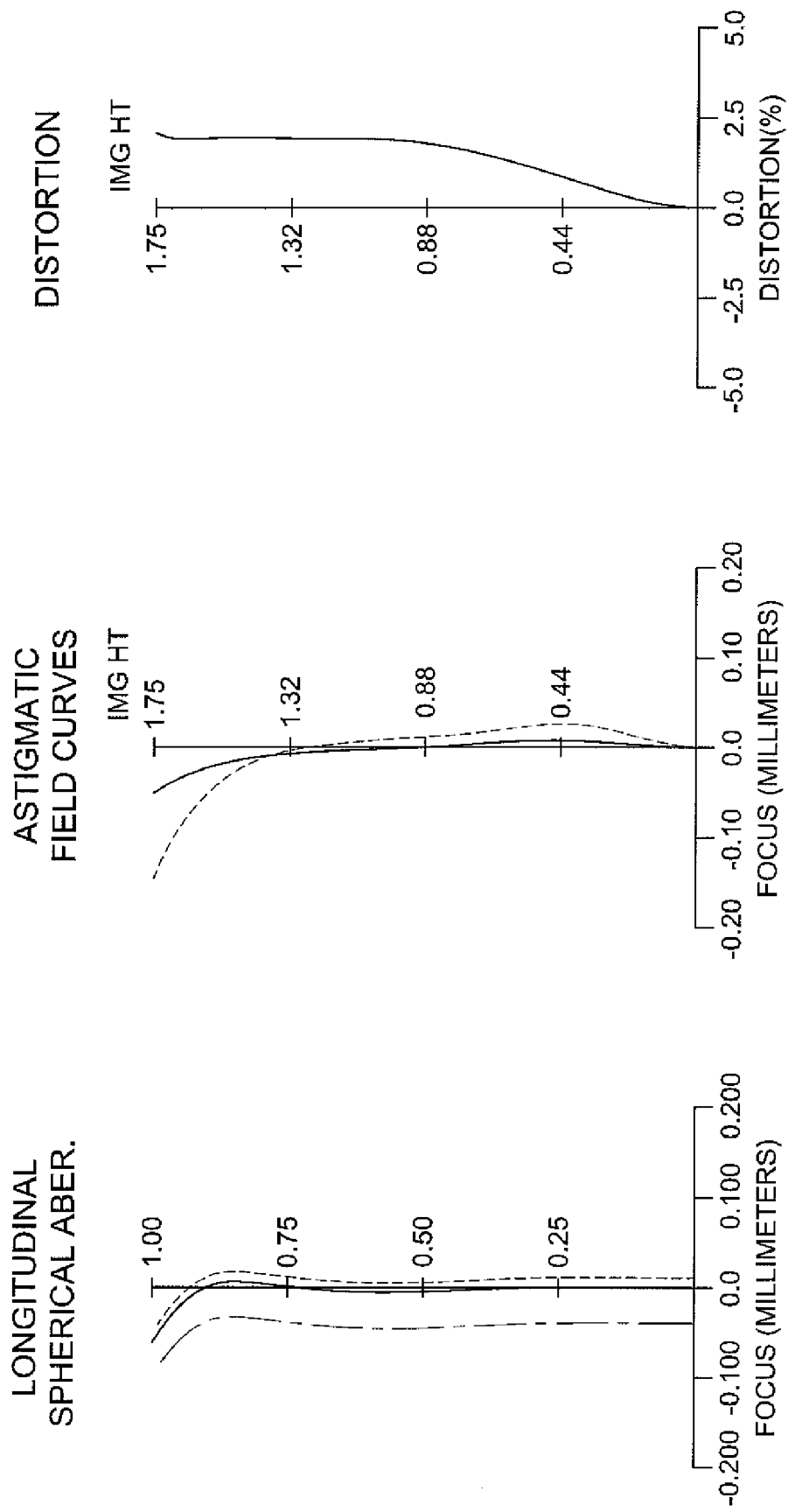
FIG. 11 shows aberration diagrams of the image pickup lens relating to Example 3, including spherical aberration, astigmatism, and distortion.

FIG. 10 is a sectional view of a lens in Example 3. FIG. 11 shows aberration diagrams of the image pickup lens relating to Example 3, including spherical aberration, astigmatism, and distortion. In the aberration diagram, in this case, a one-dot chain line indicates an amount of spherical aberration for g line, a solid line indicates an amount of spherical aberration for d line, and a broken line indicates an amount of spherical aberration for C line, respectively. Further, in the diagram of astigmatism, a solid line indicates a sagittal surface and a broken line indicates a meridional surface, respectively.

The image pickup lens in Example 3 has two lens blocks. More specifically, first lens block BK1 is composed of first lens portion L1a, aperture stop S made of optical thin film, first lens substrate LS1 and of second lens portion L1b, and then, second lens block BK2 is composed of third lens portion L2a, second lens substrate LS2 and of fourth lens portion L2b, in the order from the object side. Further, each of all surfaces of lens sections which are in contact with air has an aspheric shape.

Values corresponding to respective conditional expressions in Examples 1 to 3 are shown in Table 4.

TABLE 4

| | | (Example 1) | | | | | |
|---|---|---|---|---|---|---|---|
| | | 1a | 1b | 2a | 2b | 3a | 3b |
| dn | (1) | +30 × 10$^{-5}$ | +30 × 10$^{-5}$ | +30 × 10$^{-5}$ | +30 × 10$^{-5}$ | +30 × 10$^{-5}$ | +260 × 10$^{-5}$ |
| \|fl/f\| | (2) | 0.65 | 2.54 | 0.97 | 1.12 | 1.69 | 0.76 |
| l/h | (3) | — | 0.51 | 0.99 | — | — | 0.18 |

TABLE 4-continued

| | | | | | | |
|---|---|---|---|---|---|---|
| $\|\alpha\|$ | (4) | 0.9% | 0.9% | 0.9% | 0.9% | 0.9% | 0.4% |
| $\rho$ | (5) | 3.4% | 3.4% | 3.4% | 3.4% | 3.4% | 4.2% |

(Example 2)

| | | 1a | 1b | 2a | 2b |
|---|---|---|---|---|---|
| dn | (1) | $+100 \times 10^{-5}$ | $+60 \times 10^{-5}$ | $+100 \times 10^{-5}$ | $+60 \times 10^{-5}$ |
| $\|f1/f\|$ | (2) | 0.55 | 1.32 | 1.68 | 25.80 |
| l/h | (3) | — | 3.35 | 2.70 | 0.38 |
| $\|\alpha\|$ | (4) | 0.9% | 0.8% | 0.9% | 0.8% |
| $\rho$ | (5) | 2.3% | 1.7% | 2.3% | 1.7% |

(Example 3)

| | | 1a | 1b | 2a | 2b |
|---|---|---|---|---|---|
| dn | (1) | $+140 \times 10^{-5}$ | $+60 \times 10^{-5}$ | $+60 \times 10^{-5}$ | $+60 \times 10^{-5}$ |
| $\|f1/f\|$ | (2) | 0.60 | 1.01 | 2.16 | 1.42 |
| l/h | (3) | — | 2.92 | — | 0.39 |
| $\|\alpha\|$ | (4) | 0.6% | 0.8% | 0.8% | 0.8% |
| $\rho$ | (5) | 1.8% | 1.7% | 1.7% | 1.7% |

Now, referring to the example of the image pickup lens in Example 1, there will be shown a difference in a fluctuation amount of the paraxial image-point position when water absorption occurs, between in the case where the image pickup lens includes a lens portion with an effect to correct the fluctuation in position of the paraxial image-point caused by water absorption and in the case where the image pickup lens does not include such a lens portion, in the present invention. As for resin materials in Example 1, there are used a low dispersion resin material which is UV-curable resin with Nd of 1.52 and vd of 57 including epoxy resin, and a high dispersion resin material which is UV-curable resin with Nd of 1.55 and vd of 32 including epoxy resin. Though two types of resin materials are used in the present Example, one type of resin material or three types or more of resin materials may be used alternatively.

The low dispersion resin material in Example 1 was kept in an absolute dry condition at 95° C. for three days to be measured in terms of refractive index dn1L, and then, was kept at 60° C. and 90% RH for six days to be measured in terms of refractive index dn2L. The difference dnL between the refractive index dn2L and the refractive index dn1L measured under the initial absolute dry condition was $30\times10^{-5}$. Further, the high dispersion resin material in Example 1 was kept in an absolute dry condition at 95° C. for three days to be measured in terms of refractive index dn1H, and then, was kept at 60° C. and 90% RH for six days to be measured in terms of refractive index dn2H. The difference dnH between the refractive index dn2H and the refractive index dn1H measured under the initial absolute dry condition was $260\times10^{-5}$. Under the assumption that only the refractive index was changed by water absorption, a fluctuation amount of the paraxial image-point position is −0.001 mm.

On the other hand, as a Comparative Example 1, existing low dispersion resin material whose refractive index change caused by water absorption did not satisfy the conditional expression (1) was kept in the absolute dry condition at 95° C. for three days to be measured in terms of refractive index dn1L' and then, was kept at 60° C. and 90% RH for six days to be measured in turns of refractive index dn2L'. The difference dnL' between the refractive index dn1L' and the refractive index dn2L' measured under the initial absolute dry condition was $200\times10^{-5}$. Further, high dispersion resin material was kept under the same state of 95° C. absolute dry state for three days as that in Example 1 to be measured in terms of refractive index dn1H', and then, was kept under the condition of 60° C. 90% RH for 6 days to be measured in terms of refractive index dn2H'. There was used a material with dnH' of $260\times10^{-5}$ which was a difference between the refractive index dn2H' and refractive index dn1H' measured under the initial absolute dry condition. Under the assumption that only the refractive index was changed by water absorption, a fluctuation amount of the paraxial image-point position is −0.017 mm.

F number of the image pickup lens in Example 1 is 2.88. When pixel pitch of an image sensor to be combined with the image pickup lens is higher than 1.70 μm, which is for example, 1.75 μm, a depth of focus is expressed by about 2εF (wherein, ε represents permissible circle of confusion, and F represents an F number), thus, the depth of focus results in 20.2 μm under the assumption that the permissible circle of confusion equals to two pixel pitches. This value represents a range which extends in the optical axis direction, approximately centering on the image plane corresponding to a designed value. Therefore, it is preferable that the fluctuation amount of the paraxial image-point position caused by water absorption as a designed value is kept within 10.1 μm which corresponds to a half of the depth of focus. Table 5 shows fluctuation amounts of the paraxial image-point position in various instances on the assumption that only the refractive index was changed by water absorption. In each instance, under the condition that the high dispersion resin material in Example 1 was kept in an absolute dry condition at 95° C. for three days to be measured in terms of refractive index dn1H, then, was kept at 60° C. and 90% RH for six days to be measured in terms of refractive index dn2H, and the difference dnH between the refractive index dn2H and the refractive index dn1H measured under the initial absolute dry condition was $260\times10^{-5}$, the low dispersion resin material in Example 1 was kept in an absolute dry condition at 95° C. for three days to be measured in terms of refractive index dn1L, then, was kept at 60° C. and 90% RH for six days to be measured in terms of refractive index dn2L, and the difference dnL between the refractive index dn2L and the refractive index dn1L measured under the initial absolute dry condition was each of $30\times10^{-5}$, $70\times10^{-5}$, $110\times10^{-5}$, $150\times10^{-5}$, $190\times10^{-5}$, $200\times10^{-5}$ and $220\times10^{-5}$.

TABLE 5

| Change amount of refractive index dnL after low dispersion resin material absorbs water dnL | Fluctuation amount of paraxial image-point position after water absorption (mm) | Fluctuation amount of paraxial image-point position estimated based on depth of focus |
|---|---|---|
| $30 \times 10^{-5}$ | −0.001 | A |
| $70 \times 10^{-5}$ | −0.004 | A |
| $100 \times 10^{-5}$ | −0.007 | A |
| $110 \times 10^{-5}$ | −0.008 | A |
| $150 \times 10^{-5}$ | −0.011 | B |
| $190 \times 10^{-5}$ | −0.015 | C |
| $200 \times 10^{-5}$ | −0.017 | C |
| $230 \times 10^{-5}$ | −0.018 | C |

A: No problem
B: Influence on image quality is observed slightly, but there is no problem from a practical viewpoint.
C: Problematic It is understood that that there is no problem from a practical viewpoint even if the position of the paraxial image-point is fluctuated by water absorption, as far as difference dnL between refractive index dn2L after water absorption occurred and refractive index dn1L under the absolute dry condition is $150 \times 10^{-5}$ or less.

Incidentally, it is estimated that a pixel pitch will be narrowed in feature. Even when, for example, a pixel pitch is 1.0 µm or more, a problem caused by an influence resulting from the fluctuation in position of the paraxial image-point caused by water absorption will not occur, as far as the difference dnL from refractive index dn1L is $100 \times 10^{-5}$ or less.

Next, referring to the example of the image pickup lens in Example 2, there will be shown a difference in a fluctuation amount of the paraxial image-point position when water absorption occurs, between in the case where the image pickup lens includes a lens portion with an effect to connect the fluctuation in the position of the paraxial image-point caused by water absorption and in the case where the image pickup lens does not include such a lens portion, in the present invention.

As resin materials in Example 2, there are used a low dispersion resin material which is UV-curable resin with Nd of 1.51 and vd of 57 including epoxy resin, and a high dispersion resin material which is UV-curable resin with Nd of 1.57 and vd of 34 including epoxy resin. Though two types of resin materials are used in the present Example, one type of resin material or three types or more of resin materials may be used alternatively.

The low dispersion resin material in Example 2 was kept in an absolute dry condition at 95° C. for three days to be measured in terms of refractive index dn1L, and then, was kept at 60° C. and 90% RH for six days to be measured in terms of refractive index dn2L. The difference dnL between the refractive index dn2L and the refractive index dn1L measured under the initial absolute dry condition was $100 \times 10^{-5}$. Further, the high dispersion resin material in Example 2 was kept in an absolute dry condition at 95° C. for three days to be measured in terms of refractive index dn1H, and then, was kept at 60° C. and 90% RH for six days to be measured in terms of refractive index dn2H. The difference dnH between the refractive index dn2H, and the refractive index dn1H measured under the initial absolute dry condition was $60 \times 10^{-5}$. Under the assumption that only the refractive index was changed by water absorption, a fluctuation amount of the paraxial image-point position is −0.008 mm.

On the other hand, as a Comparative Example 2, existing low dispersion resin material whose refractive index change caused by water absorption did not satisfy the conditional expression (1) was kept in the absolute dry condition at 95° C. for three days to be measured in terms of refractive index dn1L' and then, was kept at 60° C. and 90% RH for six days to be measured in terms of refractive index dn2L'. The difference dnL' between the refractive index dn1L' and the refractive index dn2L' measured under the initial absolute dry condition was $200 \times 10^{-5}$. Further, high dispersion resin material was kept under the same state of 95° C. absolute dry state for three days as that in Example 2 to be measured in terms of refractive index dn1H', and then, was kept under the condition of 60° C. 90% RH for 6 days to be measured in terms of refractive index dn2H'. There was used a material with dnH' of $60 \times 10^{-5}$ which was a difference between the refractive index dn2H' and refractive index dn1H' measured under the initial absolute dry condition. Under the assumption that only the refractive index was changed by water absorption, a fluctuation amount of the paraxial image-point position is −0.016 mm.

Next, referring to the example of the image pickup lens in Example 3, there will be shown a difference in a fluctuation amount of the paraxial image-point position when water absorption occurs, between in the case where the image pickup lens includes a lens portion with an effect to correct the fluctuation in the position of the paraxial image-point caused by water absorption and in the case where the image pickup lens does not include such a lens portion, in the present invention.

As for resin materials in Example 3, there are used a low dispersion resin material which is UV-curable resin with Nd of 1.52 and vd of 55 including epoxy resin, and a high dispersion resin material which is UV-curable resin with Nd of 1.57 and vd of 34 including epoxy resin. Though two types of resin materials are used in the present Example, one type of resin material or three types or more of resin materials may be used alternatively.

The low dispersion resin material in Example 3 was kept in an absolute dry condition at 95° C. for three days to be measured in terms of refractive index dn1L, and then, was kept at 60° C. and 90% RH for six days to be measured in terms of refractive index dn2L. The difference dnL between the refractive index dn2L and the refractive index dn1L measured under the initial absolute dry condition was $140 \times 10^{-5}$. Further, the high dispersion resin material in Example 3 was kept in an absolute dry condition at 95° C. for three days to be measured in terms of refractive index dn1H, and then, was kept at 60° C. and 90% RH for six days to be measured in terms of refractive index dn2H. The difference dnH between the refractive index dn2H and the refractive index dn1H measured under the initial absolute dry condition was $60 \times 10^{-5}$. Under the assumption that only the refractive index was changed by water absorption, a fluctuation amount of the paraxial image-point position is −0.011 mm.

On the other hand, as a Comparative Example 3, existing low dispersion resin material whose refractive index change caused by water absorption did not satisfy the conditional expression (1) was kept in the absolute dry condition at 95° C. for three days to be measured in terms of refractive index dn1L' and then, was kept at 60° C. and 90% RH for six days to be measured in terms of refractive index dn2L'. The difference dnL' between the refractive index dn1L' and the refractive index dn2L' measured under the initial absolute dry condition was $200 \times 10^{-5}$. Further, high dispersion resin material was kept under the same state of 95° C. absolute dry state for three days as that in Example 3 to be measured in terms of refractive index dn1H', and then, was kept under the condition of 60° C. 90% RH for 6 days to be measured in terms of refractive index dn2H'. There was used a material with dnH' of $60 \times 10^{-5}$ which was a difference between the refractive index dn2H' and refractive index dn1H' measured under the initial absolute dry condition. Under the assumption that only the refractive index was changed by water absorption, a fluctuation amount of the position of the paraxial image-point is −0.017 mm.

When comparing a lens portion relating to the invention with the Comparative Example that does not include a lens portion relating to the invention, it is understood that the fluctuation amount of the paraxial image-point position caused by a change in refractive index in the case that water absorption occurs is controlled to be small. Further, resin materials having different dimension change rate α and different refractive index change do may be used for respective lens portions. In that case, it is possible to make occurrence of fluctuations in the position of paraxial image-point caused by water absorption in the total image pickup lens to be almost zero, by designing the image pickup lens with considering a scale of contributions of each lens portion to fluctuations in the position of paraxial image-point in the case of water absorption occurs.

The invention claimed is:

1. An image pickup lens comprising:
at least one lens block comprising
a lens substrate being a parallel flat plate, and
a lens portion or lens portions with positive power, formed on at least one of an object-side surface and an image-side surface of the lens substrate,
wherein the lens portion or lens portions comprise an energy-curable resin material which is different from a material of the lens substrate,
at least one lens portion with positive power among the lens portion or lens portions has a dimension change rate caused by water absorption, the dimension change rate being larger than a dimension change rate caused by water absorption of the lens substrate, and satisfies the following conditional expression (1):

$$0.0 \leq dn \leq 150 \times 10^{-5} \quad (1)$$

where dn is a difference (dn2−dn1) between a refractive index dn1 of the energy-curable resin material measured by keeping the energy-curable resin material in an absolute dry condition at 95° C. for three days and a refractive index dn2 of the energy-curable resin material measured by keeping the energy-curable resin material at 60° C. and 90% RH for six days.

2. The image pickup lens of claim 1,
wherein at least one of the lens portion or lens portions satisfies the following conditional expression (2):

$$0.5 \leq |fl/f| \leq 1.1 \quad (2)$$

wherein fl is a focal length of the lens portion obtained on an assumption that an object-side surface and an image-side surface of the lens portion are in contact with an air, and f is a composite focal length of a total system of the image pickup lens.

3. The image pickup lens of claim 1, wherein the lens portion satisfying the conditional expression (1) is placed at a position closest to an object in the image pickup lens.

4. The image pickup lens of claim 2, wherein the lens portion satisfying the conditional expression (2) is placed at a position closest to an object in the image pickup lens.

5. The image pickup lens of claim 1, further comprising a lens portion formed on at least one of the object-side surface and the image-side surface of the lens substrate of the at lease one lens block, the lens portion satisfying the conditional expression (3) and having a concave shape:

$$l/h \leq 3.5 \quad (3)$$

where l is a length in a radius direction from the most-outer periphery of an optical surface of the lens portion to an outer diameter of the lens portion, and
h is an effective radius of the lens portion.

6. The image pickup lens of claim 1,
wherein a dimension change rate a caused by water absorption of the energy-curable resin material used in the at least one of the lens portion or lens portions, satisfies the following conditional expression (4):

$$|\alpha| \leq 3.0\% \quad (4)$$

where the dimension change rate α is a change ratio (w1−w2)/w1×100 [%] which is a ratio of a difference (w2−w1) between a dimension w1 of the energy-curable resin material measured by keeping the energy-curable resin material in an absolute dry condition at 95° C. for three days and a dimension w2 of the energy-curable resin material measured by keeping the energy-curable resin material at 60° C. and 90% RH for six days, to the dimension w1 at the absolute dry condition.

7. The image pickup lens of claim 1,
wherein the energy-curable resin material used in the at least one of the lens portion or lens portions, satisfies the following conditional expression (5):

$$\rho \leq 4.5\% \quad (5)$$

where ρ is a water absorption rate and is defined as a change ratio (m1−m2)/m1×100 [%] which is a ratio of a difference (m2−m1) between a weight m1 of the energy-curable resin material measured by keeping the energy-curable resin material in an absolute dry condition at 95° C. for three days and a weight m2 of the energy-curable resin material measured by keeping the energy-curable resin material at 60° C. and 90% RH for six days, to the weight ml at the absolute dry condition.

8. The image pickup lens of claim 1, wherein the energy-curable resin material is a UV-curable resin material.

9. The image pickup lens of claim 1, wherein inorganic microparticles with a maximum size being 30 nanometers or less are dispersed in the energy-curable resin material used in the at least one of the lens portion or lens portions.

10. The image pickup lens of claim 1, wherein at least one of the lens portion or lens portions has a lens surface shape whose inclination has a same sign within an area which is inside an effective radius and excludes a lens center.

11. The image pickup lens of claim 1, wherein all surfaces in contact with an air in the lens portion or lens portions have aspheric shapes.

12. The image pickup lens of claim 1, wherein the lens substrate and at least one of the lens potion or lens portions are formed with at least one of an optical thin film and adhesive interposed therebetween.

13. An image pickup device comprising:
the image pickup lens of claim 1; and
an image pickup element for converting an optical image into electric signal,
wherein the image pickup lens forms an optical image of a subject on a light-receiving surface of the image pickup element.

14. A digital apparatus comprising the image pickup device of claim 13, and at least one of a function of shooting a still image of the subject and a function of shooting a moving image of the subject.

15. The digital apparatus of claim 14, wherein the digital apparatus is a mobile terminal.

16. A manufacturing method of the image pickup lens comprising at least one lens block in which a lens portion or lens portions with positive power is formed on at least one of an object-side surface and an image-side surface of a lens substrate being a parallel flat plate, the method comprising:
a step of forming lens block units by forming an energy-curable resin material with a mold into a plurality of lens portions on each of an object-side surface and an image side surface of a lens substrate of each of the lens block units, the energy-curable resin material being different from a material of the lens substrate;
a joining step of joining the plurality of lens block units together with an interval regulating section interposed therebetween; and
a cutting step of cutting the joined lens block units along the interval-regulating section to separate the joined lens block units into pieces each including a plurality of the lens blocks which are unified,
wherein, in the step of forming a plurality of lens block units, a plurality of lens portions with positive power is formed with a mold on at least one of the object side surface and the image side surface of at least one of the lens block units,
the lens portions with positive power have a dimension change rate caused by water absorption, where the dimension change rate is larger than a dimension change rate caused by water absorption of the lens substrate of the at least one of the lens block units, and
the lens portions with positive power satisfy the following conditional expression (1):

$$0.0 \leq dn \leq 150 \times 10^{-5} \tag{1},$$

where dn is a difference (dn2−dn1) between a refractive index dn1 of the energy-curable resin material measured by keeping the energy-curable resin material in an absolute dry condition at 95° C. for three days and a refractive index dn2 of the energy-curable resin material measured by keeping the energy-curable resin material at 60° C. and 90% RH for six days.

* * * * *